(12) United States Patent
Moriyama et al.

(10) Patent No.: US 8,412,505 B2
(45) Date of Patent: Apr. 2, 2013

(54) DECENTRALIZED SIMULATION SYSTEM, METHOD FOR IDENTIFYING SIMULATORS AND SIMULATION MODELS

(75) Inventors: Yu Moriyama, Hyogo (JP); Tomotaka Nakaminami, Hyogo (JP)

(73) Assignee: Fujitsu Ten Limited, Kobe (JP)

( * ) Notice: Subject to any disclaimer, the term of this patent is extended or adjusted under 35 U.S.C. 154(b) by 662 days.

(21) Appl. No.: 11/889,043

(22) Filed: Aug. 8, 2007

(65) Prior Publication Data

US 2008/0052049 A1    Feb. 28, 2008

(30) Foreign Application Priority Data

Aug. 9, 2006  (JP) ................. P2006-217393

(51) Int. Cl.
    *G06G 7/48*    (2006.01)
(52) U.S. Cl. .............. 703/13; 703/6; 703/7; 703/8
(58) Field of Classification Search .......... 703/13, 703/6–8
    See application file for complete search history.

(56) References Cited

U.S. PATENT DOCUMENTS

| | | | | |
|---|---|---|---|---|
| 2002/0052725 | A1* | 5/2002 | Wasynczuk et al. | 703/22 |
| 2002/0134149 | A1* | 9/2002 | Shiraishi et al. | 73/146 |
| 2002/0158818 | A1* | 10/2002 | Noh | 345/50 |
| 2002/0198609 | A1* | 12/2002 | Baron | 700/48 |
| 2004/0064235 | A1* | 4/2004 | Cole | 701/70 |
| 2004/0239517 | A1* | 12/2004 | Coley et al. | 340/686.6 |
| 2005/0240319 | A1* | 10/2005 | Sawada | 701/1 |
| 2005/0278234 | A1* | 12/2005 | Wagner et al. | 705/35 |
| 2005/0283417 | A1* | 12/2005 | Miles et al. | 705/35 |

FOREIGN PATENT DOCUMENTS

| | | |
|---|---|---|
| JP | A-08-054907 | 2/1996 |
| JP | A-10-271142 | 10/1998 |
| JP | A-2000-020485 | 1/2000 |
| JP | A-2001-209668 | 8/2001 |
| JP | A-2002-342297 | 11/2002 |
| JP | A-2006-195606 | 7/2006 |
| WO | WO 2005/106664 A2 | 11/2005 |

OTHER PUBLICATIONS

Lin et al., Integrated, Feed-Forward Hybrid Electric Vehicle Simulation in SIMULINK and its Use for Power Management Studies, 2001, Society of Automotive Engineers, Inc.*

Sep. 20, 2011 Japanese Office Action issued in Japanese Patent Application No. 2006-217393 (with translation).

Shiraishi et al, "Parallel Job Execution Tool: ParaJET, The Technical Reports of the Institute of Electronics, Information and Communication Engineers", vol. 96, No. 231, Aug. 27, 1996, pp. 23-30 (with translation).

Yatnasaki et al, "Development of CRAMAS Motor Board," Fujitsu Ten Tech J, vol. 23, No. 2, Dec. 2005, pp. 15-21 (with translation).

* cited by examiner

*Primary Examiner* — Mary C Jacob
*Assistant Examiner* — Aniss Chad
(74) *Attorney, Agent, or Firm* — Oliff & Berridge, PLC

(57) ABSTRACT

A plurality of simulators operable to decentrally execute arithmetic operations based on a plurality of simulation models which are respectively assigned to the simulators under the control of a management device. A notifying section is operable to provide a notification so as to relate information regarding one of the simulation models displayed on a display of the management device to one of the simulators which executes an arithmetic operation based on the one of the simulation models. The management device and the simulators are connected with each other via a network.

6 Claims, 18 Drawing Sheets

990

20, 21, 30, 40

991

20, 21, 30, 40

DECENTRALIZED SIMULATION SYSTEM, METHOD FOR IDENTIFYING SIMULATORS AND SIMULATION MODELS

The disclosure of Japanese Patent Application No. 2006-217393 filed on Aug. 9, 2007 including specification, drawings and claims is incorporated herein by reference in its entirety.

BACKGROUND

The present invention relates to a decentralized simulation system in which a management device and a plurality of simulators are connected via a network, and in which a plurality of simulation models respectively assigned to the simulators under the control of the management device are decentrally executed, and a method for identifying the simulators and the simulation models in the decentralized simulation system.

Recently, in various fields, a computer carries out an arithmetic operation on a model in which a role of a mechanism, an electrical signal, or the like has been numerically expressed in an actual device or plant. In other words, a simulation device capable of checking product characteristics or extracting potential problems by executing simulation in a virtual space, without performing actual verification experiments is used in the various fields. By employing the simulation device, the time or cost required for product development can be reduced and the safety of product development can be improved.

When multiple complex models are to be processed in correspondence with a system of a complex device or plant, a simple simulation device may have a limitation due to hardware controlling an arithmetic operation speed or a limitation due to an increase in the processing load of an arithmetic device processing software. Thus, a decentralized simulation system is widely used in which a model is divided into multiple models and multiple simulation devices corresponding to the models are connected with each other via a network.

It is necessary in this decentralized simulation system to efficiently use hardware capabilities of the overall system in order to reduce the time or cost required for simulation.

In a decentralized simulation system of Patent Document 1, it is an object to determine each model arrangement based on a central processing unit (CPU) load rate or memory consumption amount when an individual model is executed and an actual system resource consumption amount such as an amount of data exchanged with another model. In the Patent Document 1, a decentralized simulation controller has been proposed for measuring system resources consumed by each model, determining an arrangement position of each model in a series of model groups to be subsequently executed on the basis of the measured value, and assigning respective models to a plurality of processors in the determined arrangement position.

The decentralized simulation controller of the Patent Document 1 assigns optimal models to optimal hardware resources and executes simulation in optimal conditions in the overall system.

Patent Document 1: Japanese Patent Publication No. 2002-342297A

However, for example, even when a hardware resource fails during simulation execution and the maintenance of a system is required in the decentralized simulation controller of the Patent Document 1, it is difficult to discriminate the failed hardware resource since it is unclear which model is assigned to the hardware resource and, inversely, the model assigned to the hardware resource may not be determined from the above-mentioned hardware resource.

SUMMARY

It is therefore an object of the invention to provide a decentralized simulation system capable of easily relating and detecting hardware resources to software resources of models and the like assigned to the hardware resources.

In order to achieve the above objects, according to a first aspect of the invention, there is provided a decentralized simulation system, comprising:

a management device;

a plurality of simulators operable to decentrally execute arithmetic operations based on a plurality of simulation models which are respectively assigned to the simulators under the control of the management device; and a notifying section operable to provide a notification so as to relate information regarding one of the simulation models displayed on a display of the management device to one of the simulators which executes an arithmetic operation based on the one of the simulation models, wherein the management device and the simulators are connected with each other via a network.

With the above-mentioned configuration, it is easy to detect which one of the simulation models is assigned to one of the simulators since the notification section provides a notification so as to relate information regarding the one of the simulation models to the one of the simulators executing an arithmetic operation based on the one of the simulation model.

According to the invention as described above, there is provided a decentralized simulation system capable of easily detecting hardware resources corresponding to software resources of models and the like assigned to the hardware resources.

BRIEF DESCRIPTION OF THE DRAWINGS

The above objects and advantages of the present invention will become more apparent by describing in detail preferred exemplary embodiments thereof with reference to the accompanying drawings, wherein:

FIG. 9(*b*) is an illustrative view of a light emitting section of a simulation device (or simulator);

DETAILED DESCRIPTION OF THE EMBODIMENTS

Hereinafter, embodiments of the invention will be described with reference to the drawings and an example of a decentralized simulation system in which a management device and a plurality of simulators for simulating sections of respective parts of a vehicle are connected via a network.

Figure 2:
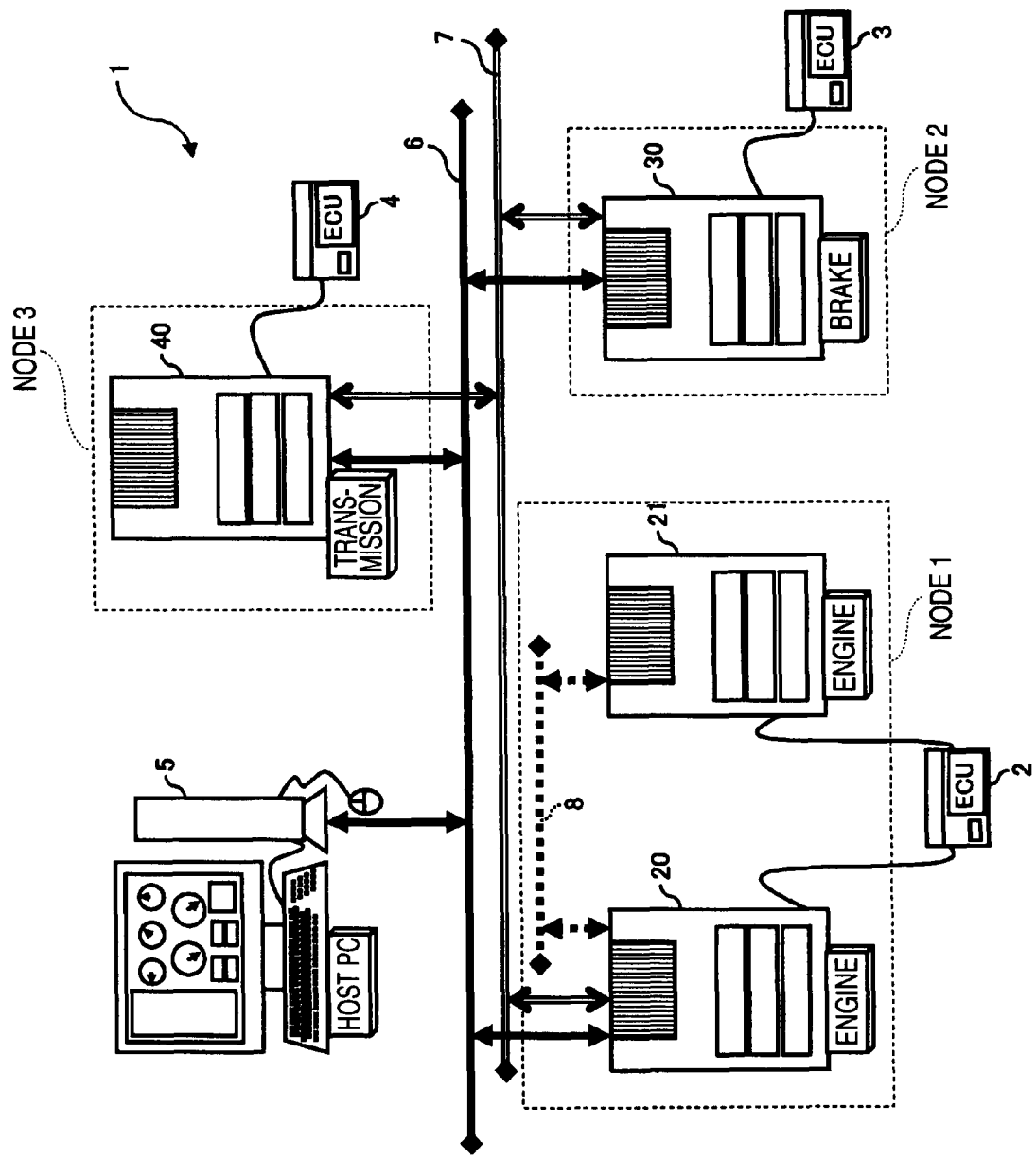
FIG. 2 is a configuration diagram of a decentralized simulation system.

As shown in FIG. 2, there is provided a decentralized simulation system 1 in which a plurality of simulators 20, 21, 30, and 40, locally connected to control systems 2, 3, and 4 serving as evaluation targets, for simulating a controlled system to be controlled by the control system 2, 3, and 4 are connected to a host computer Hereinafter, referred to as "host PC") serving as a management device for evaluating the control systems 2, 3, and 4 by managing the simulators 20, 21, 30, and 40 via a network (or Ethernet (of the trademark of Xerox Corporation)) 6, and each of the simulators 20, 21, 30, and 40 simulates an operation of the controlled system or a vehicle operation by repeating a predefined unit simulation arithmetic process in a predefined period.

The simulator 21 serves as a slave simulator for which the simulator 20 is a master simulator and is not directly connected to the network 6. The simulator 21 and the simulator 20 are connected via a network 8 and the simulator 21 is configured to receive data from the host PC 5 via the network 8. Furthermore, the master simulator and the slave simulator will be described below.

The simulators 20, 21, 30, and 40 simulate the vehicle's functional blocks such as an engine, a brake, and the like. Specifically, the simulators 20 and 21 simulate an engine system, the simulator 30 simulates a brake system, and the simulator 40 simulates a transmission system. In this embodiment, a description is focused on these simulators. Actually, multiple simulators configuring other functional blocks of the vehicle are connected to the network 6.

The simulators 20, 21, 30, and 40 are locally connected to electronic control units (ECUs) 2, 3, and 4 serving as control systems equipped with microcomputers for electronically controlling the simulators 20, 21, 30, and 40. The simulators 20, 21, 30, and 40 are configured to carry out predefined simulation arithmetic operations in response to control commands from the ECUs 2, 3, and 4 and output arithmetic operation results to the ECUs 2, 3, and 4. Herein, the ECU 2 is an engine control ECU, the ECU 3 is a brake control ECU, and the ECU 4 is a transmission control ECU.

The ECU is not limited to a form mountable to an actual device that is embedded into a CPU board. In an ECU development phase and the like, the simulation ECU configured from a PC for emulating the ECU and an operating program or peripheral device thereof can be connected to the simulator.

The host PC 5 is provided with an arithmetic processing section, a display section, a storage section, and the like. The storage section stores a plurality of simulation models (hereinafter, referred to as models in a program for simulating the controlled system serving as a functional block of the vehicle such as the engine, the brake, or the like, in a numerical expression) assigned to the simulators 20, 21, 30, and 40 and a control program for setting simulation conditions. When the simulation models are assigned to the simulators 20, 21, 30, and 40 via the network 6 on the basis of setting conditions from an operator through a graphical user interface (GUI) implemented with the arithmetic processing section and the display section, simulation is executed and controlled by inputting predefined simulation conditions.

The host PC 5 is configured to detect each of the simulators 20, 21, 30, and 40 in a node unit as described below and graphically display the set conditions or a node configuration and measurement data of each section received from the simulators 20, 21, 30, and 40, for example, arithmetic operation results based on the assigned simulation models serving as data of the number of engine revolutions, an oil temperature, and the like on the display section. The host PC 5 is configured to evaluate each of the ECUs 2, 3, and 4 while the operator manipulates or checks a display picture.

The simulators 20, 21, 30, and 40 independently or cooperatively carry out arithmetic operations based on the models. That is, for a model in which an operation is complex or an arithmetic operation load according to execution is large, the arithmetic operation is not carried out in a stand-alone simulator with a hardware configuration for executing the corresponding model, but is carried out in a plurality of simulators with hardware configurations whose functions are divided.

Hardware carrying out an arithmetic operation based on each model or a simulator unit is referred to as a "node". When the node is configured from a plurality of simulators, the node is configured from one master simulator and one or more slave simulators. In this embodiment, the simulators 20 and 21 configure a node 1, the simulator 30 configures a node 2, and the simulator 40 configures a node 3.

Figure 3:
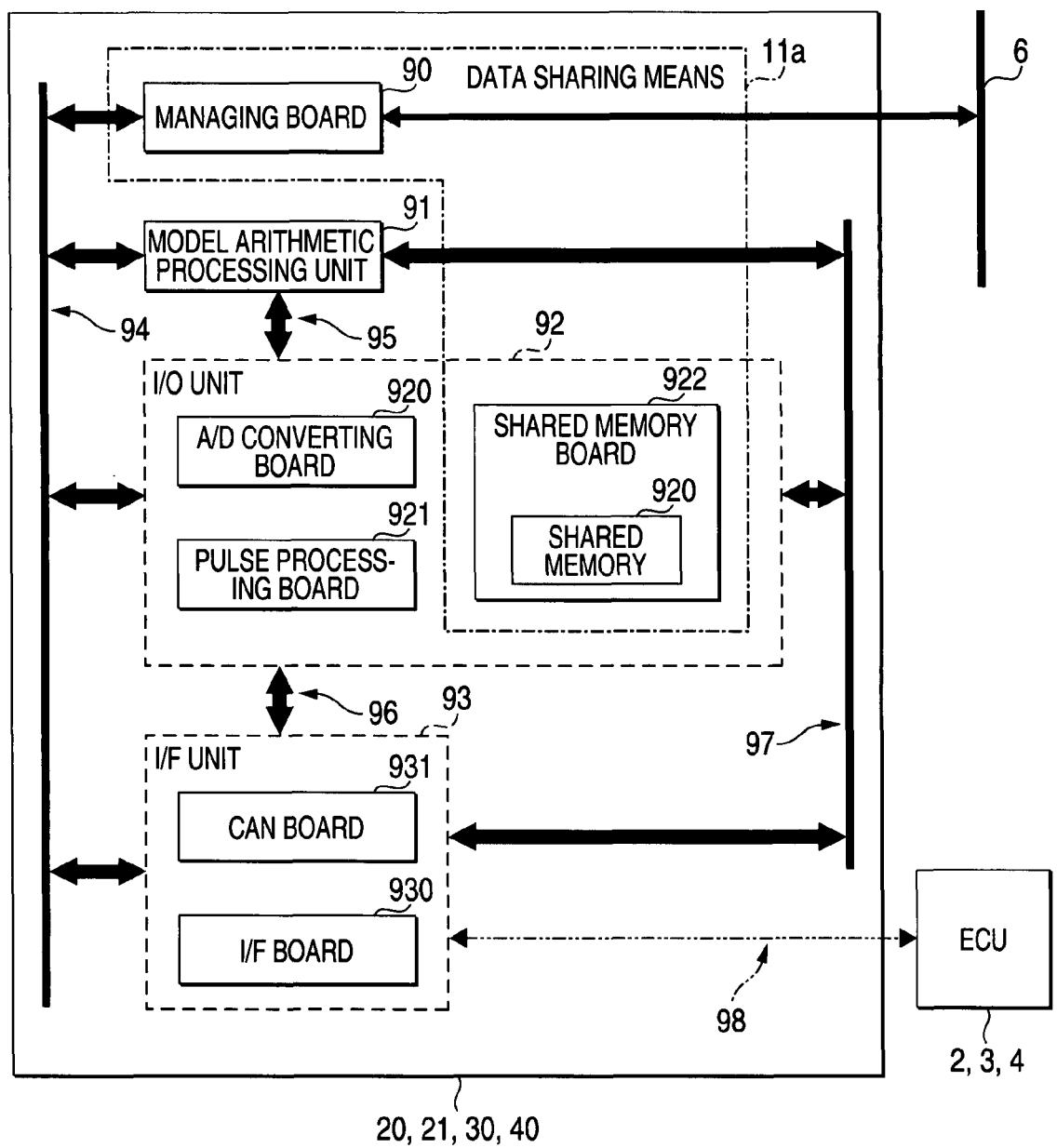
FIG. 3 is a block configuration diagram of a simulation device (or simulator)

As shown in FIG. 3, the simulators 20, 21, 30, and 40 have a port for connecting to the network 6 in an on-board. Each of the simulators 20, 21, 30, and 40 includes a managing board 90 having a CPU for executing an operating system for controlling the simulator, a model arithmetic processing unit 91 configured by one or more CPU boards with a CPU for carrying out an arithmetic operation on a simulation model assigned from the host PC 5, an input/output (I/O) unit 92 including a plurality of I/O boards 920 and 921 having various types of drivers for converting a logical level into a signal of a physical level based on an arithmetic operation result input from the model arithmetic processing unit 91 and converting a control signal of a physical level from the ECUs 2, 3, and 4 into a control signal of a logical level to output the control signal of the physical level to the model arithmetic processing unit 91 and a shared memory board 922 having a shared memory 923 for mutually exchanging related data including process data required for arithmetic operations between the simulators 20, 30, and 40, and an interface (I/F) unit 93 including an I/F board 930 having a level conversion function for matching signal levels between the ECUs 2, 3, and 4 and the I/O unit 92 or a controller area network (CAN) board 931 for relaying a CAN bus signal for transmitting data between the ECUs. The model arithmetic processing unit 91, the I/O unit 92, and the I/F unit 93, respectively connected to the managing board 90 via a peripheral component interconnect (PCI) bus 94, are connected by a plurality of local signals 95, 96, and 97.

When input/output ports of the ECUs 2, 3, and 4 and the I/F unit 93 are connected by a harness 98 for signal transmission available in the actual device. The I/F unit 93 matches a signal level with the I/O unit 92.

The model assigned from the host PC 5 includes one or more models. CPU boards configuring the model arithmetic processing unit 91 carry out arithmetic operations based on different models.

The I/O unit 92 includes an analog-to-digital (A/D) converting board 920 for converting a digital signal of an engine oil temperature, an exhaust gas temperature, an oxygen concentration of exhaust gas, or the like serving as an arithmetic operation result of a model executed by each CPU board into an analog signal and converting an analog signal for control output from the I/F unit 93 into a digital signal, a pulse processing board 921 for converting data of each type of logical level serving as an arithmetic operation result of a model executed by the model arithmetic processing unit 91 into a pulse signal and converting a pulse signal input through the I/F unit 93 into data of a logical level, and the like. For example, the pulse processing board 921 converts the number of engine revolutions serving as an arithmetic operation result of the model arithmetic processing unit 91 carrying out an arithmetic operation based on an engine model into a clock pulse signal, and converts a duty control signal for each type of magnetic valve from the ECUs 2, 3, and 4 input through the I/F unit 93 into digital data.

Figure 4:
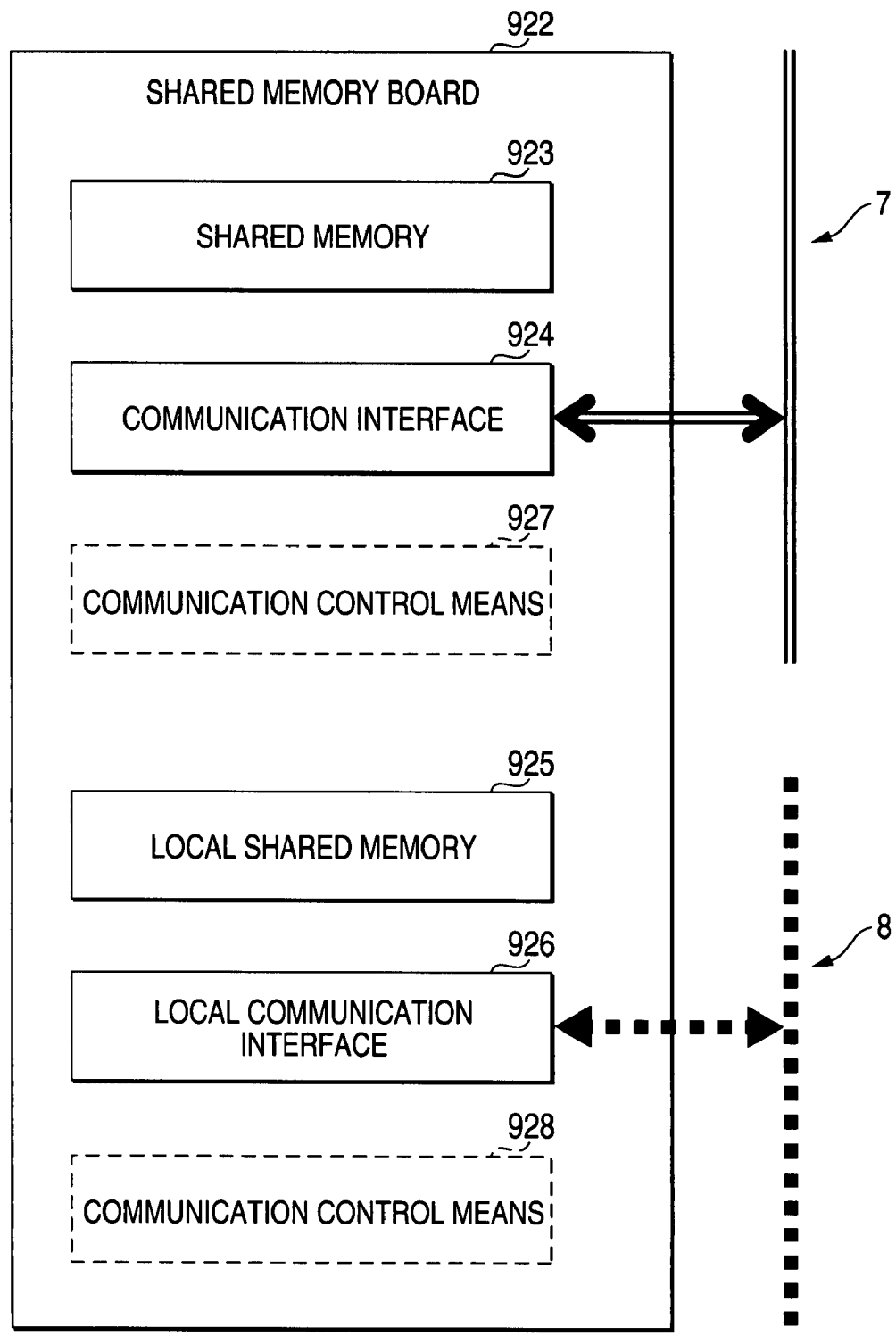
FIG. 4 is a block configuration diagram of principal sections of a simulation device (or simulator)

As shown in FIG. 4, the shared memory board 922 mounted in the I/O unit 92 of each of the master simulators 20, 30, and 40 includes a shared memory 923 for exchanging related data required for a model arithmetic operation with another master simulator, a communication interface 924 connected to a star fabric, a high-speed local area network CLAN), or the like for realizing a communication rate of several tens Gbps or several Gbps using an optical fiber 7 for transmission control of data stored in the shared memory 923 between the simulators, a local shared memory 925 for exchanging related data required for an arithmetic operation with a slave simulator, a local communication interface 926 for transmitting and controlling related data by connecting to the network 8 for transmitting related data stored in the local shared memory 925, and the like. The shared memory board 922 includes communication control means 927 and 928 for managing the communication interfaces 924 and 926.

A data sharing means 11 for sharing data between the simulators 20, 21, 30, and 40 is configured by the managing board 90 for managing the shared memory board 922 and the shared memory 923 or the local shared memory 925. A data sharing process will be described below.

Figure 5:
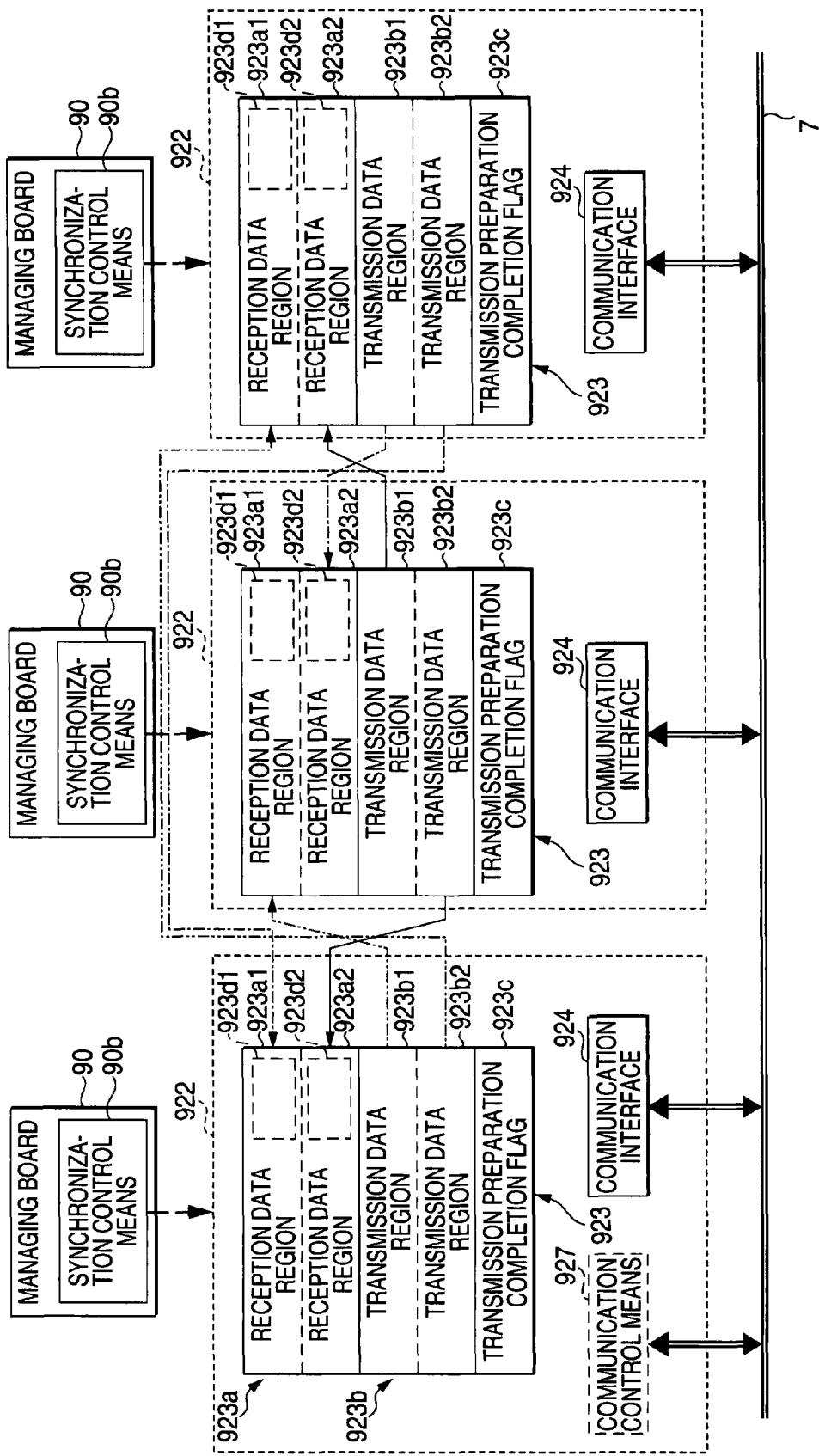
FIG. 5 is an illustrative view of a data sharing means.

As shown in FIG. 5, each shared memory 923 is divided into a reception data region 923a storing related data input from another simulator for related data required for the ECU connected to the local device or the model arithmetic processing unit 91 of the local device and a transmission data region 923b storing related data generated in the local device for related data required for the ECU connected to another simulator or the model arithmetic processing unit 91 of another simulator. At a predefined timing as described below, related data stored in the transmission data region 923b of another simulator via the communication interface 924 is delivered to the reception data region of the local device, and related data stored in the transmission data region 923b of the local device is delivered to the reception data region 923a of another simulator. Herein, the reception data region 923a is classified into a different region in another simulator serving as a source and the transmission data region 923b is classified into a different region in another simulator serving as a destination.

For example, related data including a control signal or data flowing the CAN bus of the ECU connected to the local device is stored in the transmission data region 923b through the CAN board 931 of the local device. After the related data is transmitted to the reception data region 923a of another simulator via the communication interface 924, the data is outputted to the harness 98 of the ECU connected to the other simulator through the CAN board 931 of the other simulator. Furthermore, related data including a control signal or data flowing the CAN bus of the ECU connected to another simulator is stored in the transmission data region 923b through the CAN board 931 of another simulator. After the related data is transmitted to the reception data region 923a of the local device via the communication interface 924, the data is outputted to the harness 98 of the ECU connected to the local device through the CAN board 931 of the local device. The CAN bus is emulated by the CAN board 931, the shared memory board 922, and the communication interface 924.

Similarly, in terms of related data to be shared between the model arithmetic processing units 91 or the I/O units 92 of the simulators 20, 30, and 40, related data to be delivered to another simulator is stored in the transmission data region 923b and related data to be delivered from another simulator via the communication interface 924 is loaded in the reception data region 923a.

The exchange of related data between the shared memories 923 provided in the simulators 20, 30, and 40 has been described above. Similarly, related data of the local shared memories 925 provided in the simulators 20 and 21 can be exchanged. The local shared memory 925 is divided into a reception data region 925a and a transmission data region 925b. The related data is exchanged via the local communication interface 926.

Figure 6:
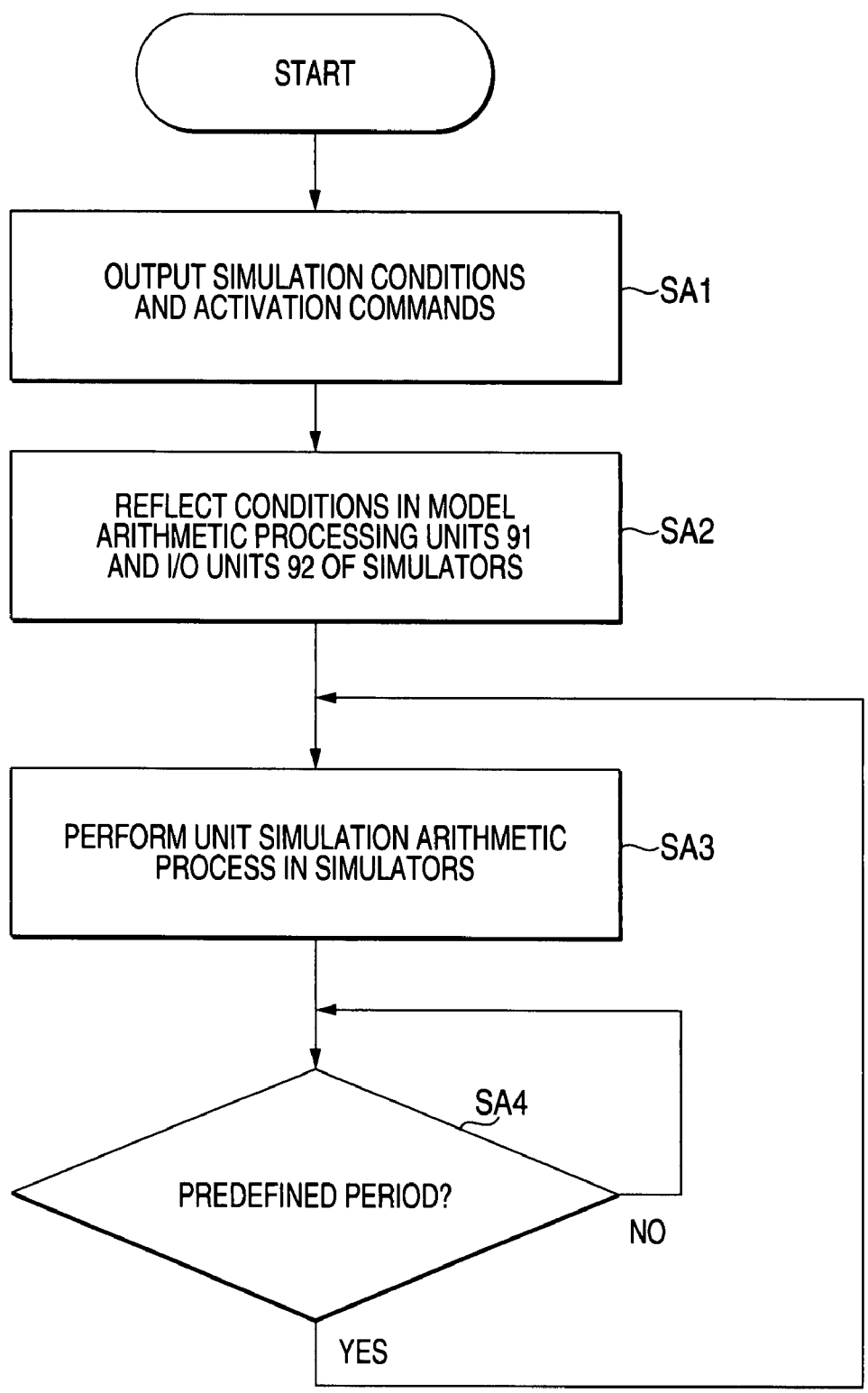
FIG. 6 is a flowchart used to illustrate simulation of an operation of a vehicle to be performed in the decentralized simulation system.

In the simulation of the operation of the vehicle to be carried out in the decentralized simulation system 1 as shown in FIG. 6, when the host PC 5 outputs simulation conditions and activation commands to the managing boards 90 of the simulators 20, 21, 30, and 40 via the network 6 to activate the simulators 20, 21, 30, and 40 in simulation conditions manipulated by the operator via the GUI or simulation conditions prepared in advanced as a program (SA1), each managing board 91 reflects the simulation conditions in the model arithmetic processing unit 91 and the I/O unit 92 via the PCI bus 94 (SA2), and the simulators 20, 21, 30, and 40 repeat a predefined unit simulation arithmetic process as described below according to the given simulation conditions (SA3, SA4).

For example, when an activation command is output from the host PC 6 in the simulation condition that each of the ECUs 2, 3, and 4 input through the GUI is connected to a battery, a battery voltage signal is output from the model arithmetic processing unit 91 to the I/O unit 92. When the battery voltage signal is converted into a voltage of direct current (DC) 14V by the I/F unit 93, the battery voltage is supplied to each of the ECUs 2, 3, and 4. When a reset signal is input by a reset circuit operating at the battery supply voltage, each of the ECUs 2, 3, and 4 starts a control operation.

Thereafter, the control command from each of the ECUs 2, 3, and 4 is transferred to the model arithmetic processing unit 91 via the I/F unit 93 and the I/O unit 92. The model arithmetic processing unit 91 carries out a simulation arithmetic operation for simulating an operation of the engine or the like. Simulation arithmetic operation results based on the model arithmetic processing unit 91 are converted into various types of state signals of the actual vehicle via the I/O unit 92 and the I/F unit 93, and are input to the ECUs 2, 3, and 4.

In this state, when the host PC 5 outputs a simulation condition that an ignition switch signal input via the GUI is turned on, for example, the engine ECU 2 outputs a control signal for activating a starter motor and the model arithmetic processing unit 91 carries out a simulation arithmetic operation of the starter motor, such that the engine simulation arithmetic operation is activated.

For example, when the behavior of the vehicle is analyzed while the engine is rotated at high speed, state data of the vehicle from the host PC 5 during the high-speed rotation of the engine is input to the managing board 90 for initial data of the simulation condition. The vehicle state data is reflected from the managing board 90 to the model arithmetic processing unit 91, such that each simulator is activated.

For example, when the operation of each of the ECUs 2, 3, and 4 is evaluated in the case where a sensor of the engine system has failed, the host PC 5 inputs, to the managing board 90, an event occurrence condition serving as a simulation condition that the sensor fails during engine activation. The vehicle state data is reflected from the managing board 90 to the model arithmetic processing unit 91, such that each of the simulators 20, 21, 30, and 40 is activated.

Input data from the ECU and the like to the model arithmetic processing unit 91 or arithmetic operation results of the model arithmetic processing unit 91 are received by the managing board 90 via the PCI bus 94 and then are output to the host PC 5 via the network 6. For example, the data or arithmetic operation results are converted into display data such as a trend graph or graphic data and are displayed on a screen of a display section of the host PC 5. Specifically, the data or arithmetic operation results are displayed as a trend graph indicating a change of the number of engine revolutions or fuel consumption, and are displayed on a number-of-revolutions indicator or a speed indicator obtained by simulating a display unit of a driver's seat.

In order to display a simulation arithmetic operation result or a simulation condition indicating which simulation arithmetic operation is carried out in a certain condition on the display unit of the host PC 5, a type of data to be received from each of the simulators 20, 21, 30, and 40 is set through the host PC 5. According to this, a control state of each of the ECUs 2, 3, and 4 can be evaluated.

Figure 1:
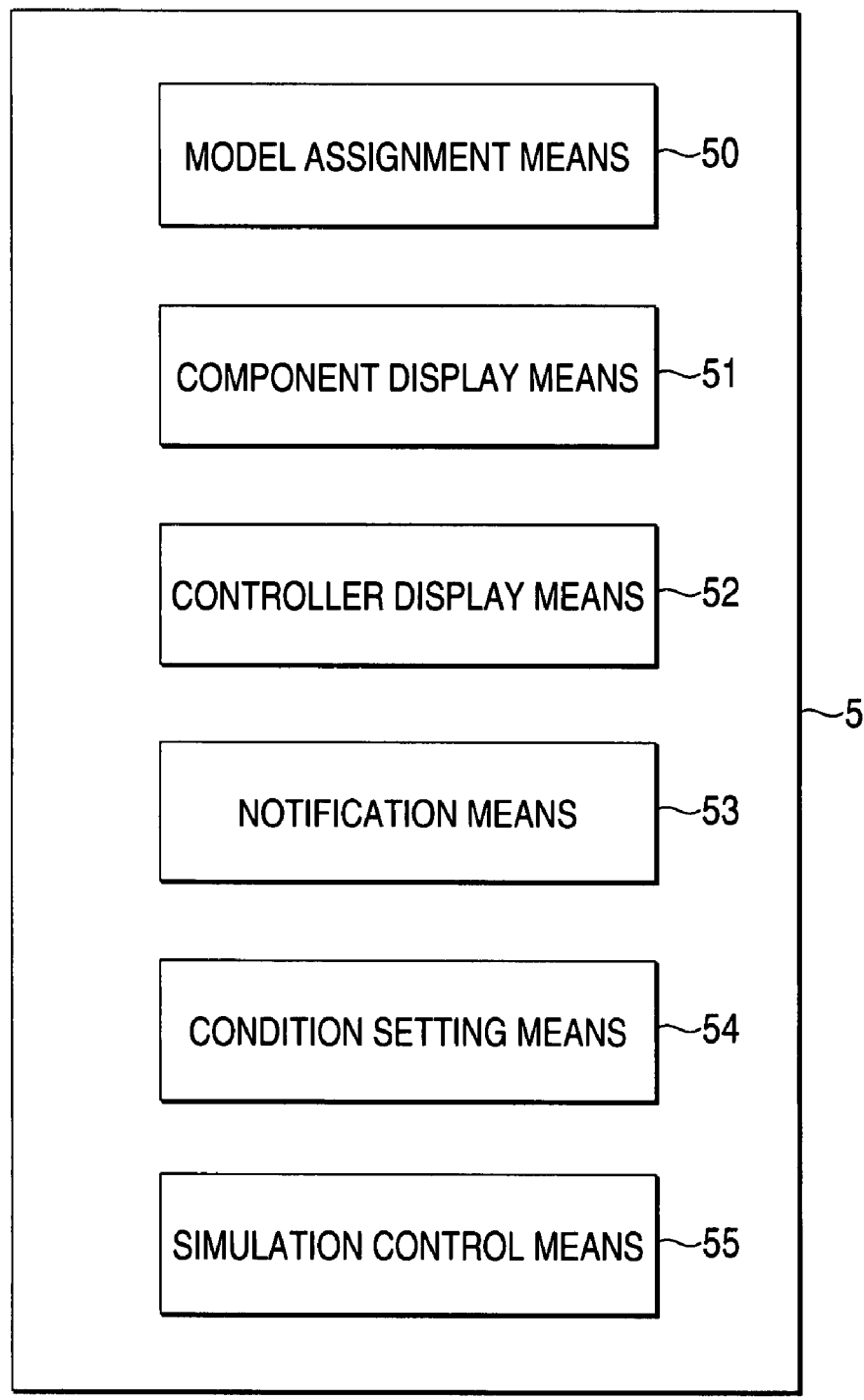
FIG. 1 is a functional block diagram of a management device (or host PC)

As shown in FIG. 1, the host PC 5 includes a model assignment means 50 for assigning models serving as software resources to the model arithmetic processing units (or CPU boards) 91 of the simulators 20, 21, 30, and 40, a component display, means 51 for displaying components including the assigned software resources and hardware resources of the model arithmetic processing units (or CPU boards) 91, the I/O units 92, the I/F units 93, or the like configuring the simulators 20, 21, 30, and 40 on the display section, a controller display means 52 for receiving arithmetic operation results of the simulators 20, 21, 30, and 40, and displaying the received arithmetic operation results on the display section, a condition setting means 54 for setting simulation conditions in the simulators 20, 21, 30, and 40, a simulation control means 55 for indicating the initiation or termination of simulation, and the like.

Figure 8:
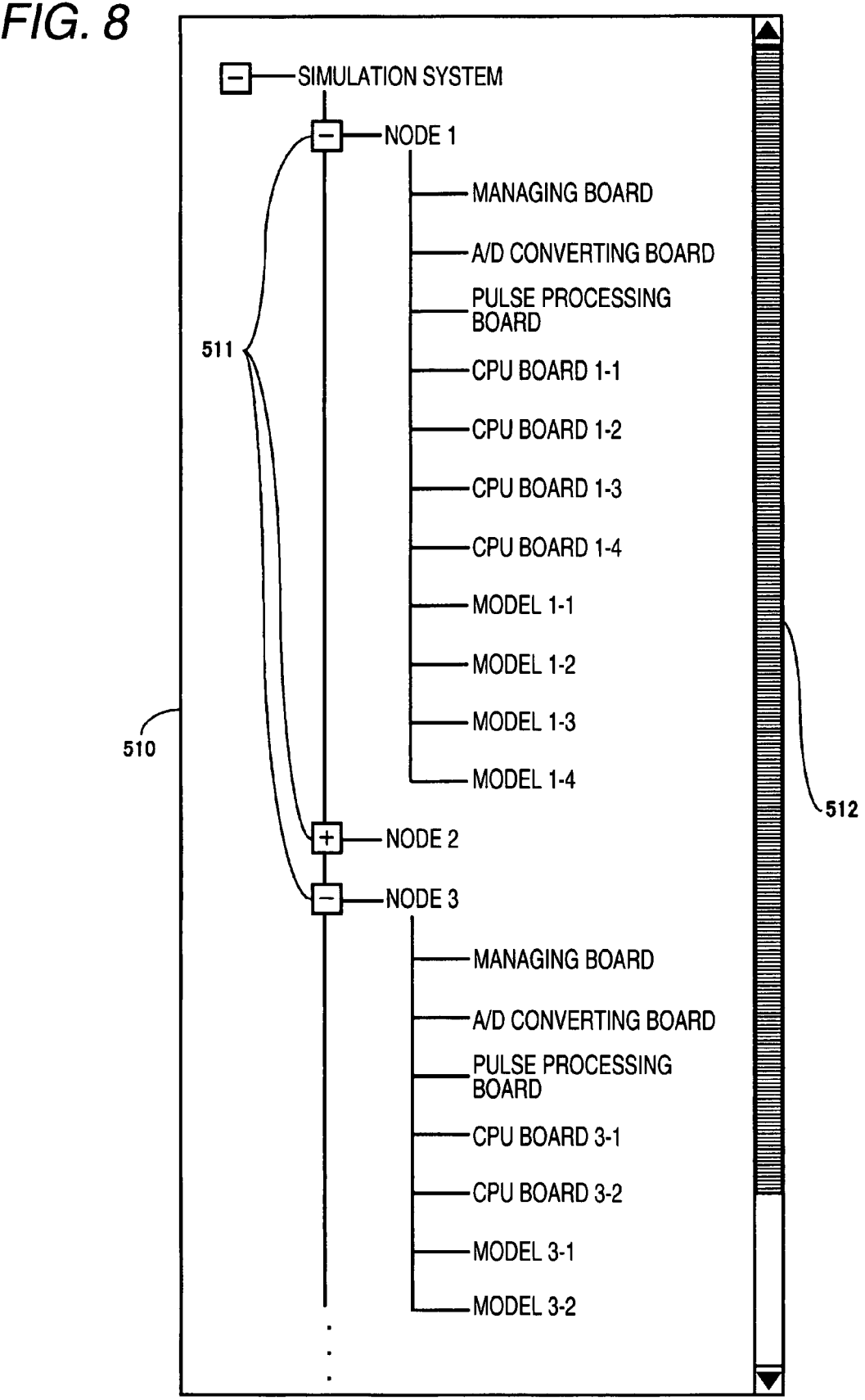
FIG. 8 is an illustrative view of a component display picture.

As shown in FIG. 8, the component display means 51 displays components of the simulators 20, 21, 30, and 40 in a tree form of a component display picture 510. The component display picture 510 is configured to display each node in a highest layer and display hardware and software resources configuring the node in a lower layer. When a box 511 arranged at the left side of the node is displayed with "+", only a node name is displayed. When the box 511 is clicked with a mouse, a change is made to a "−" a indication and hardware and software resources are displayed in a lower layer of the node name. When the number of components is large and the picture cannot be displayed at one time, a desired node's components are scrolled and displayed by vertically moving a scroll bar 512 displayed at the right side of the picture and a configuration thereof can be checked.

The model assignment means 50 lists and displays simulation models stored in the host PC 5 on the display section. When the operator makes an operation (for example, a drag and drop operation) related to a specific CPU board displayed on the component display picture 510 in which a specific model is selected from the list, the model is implanted into the corresponding CPU board in order to assign the specific model to the corresponding CPU board. The implanted model is displayed under the node corresponding to the component display picture 510.

Figure 7:
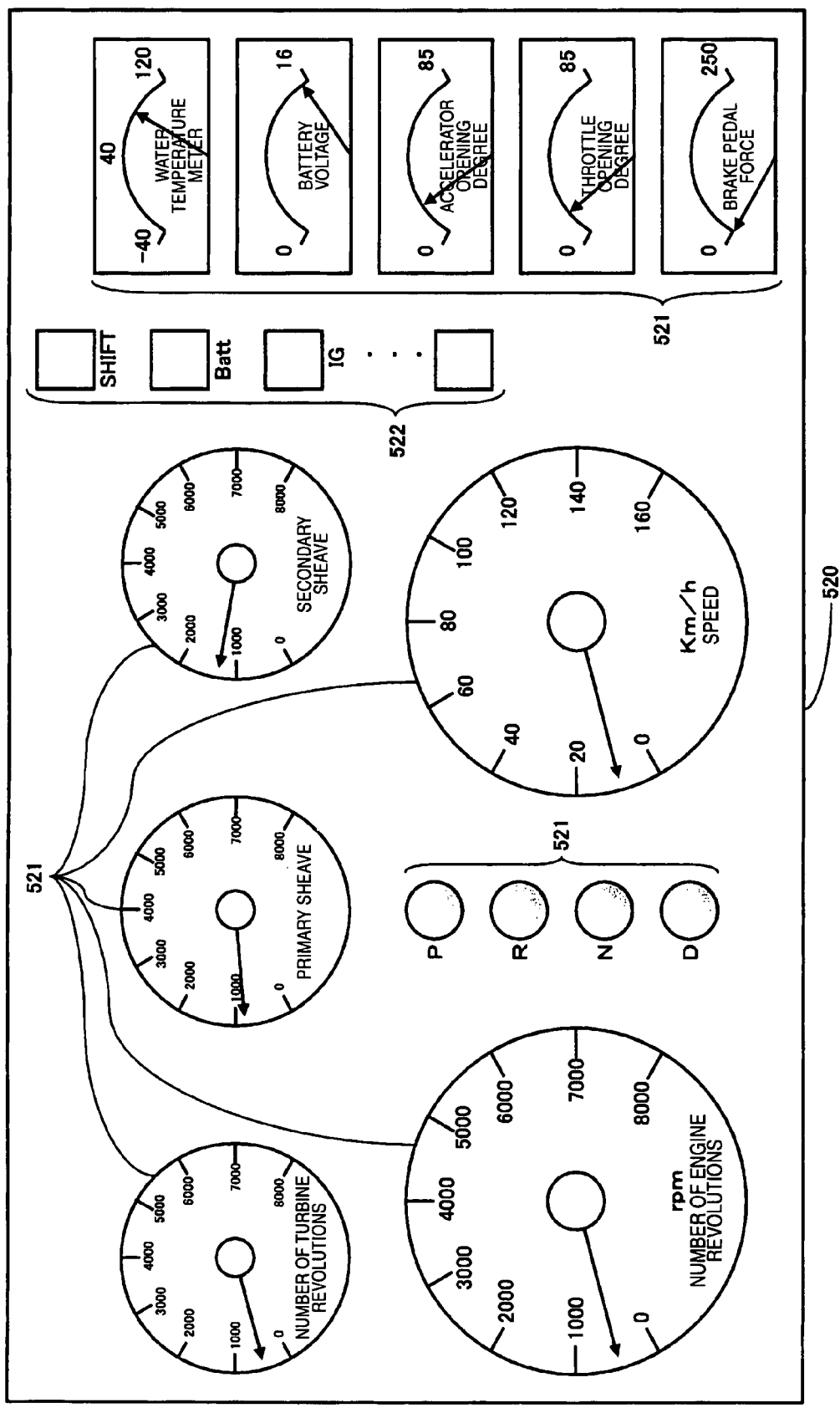
FIG. 7 is an illustrative view of a control picture.

The controller display means 52 displays, in a GUI format, a control picture configured by operation switches 522 for setting arithmetic operation conditions of models, implanted into nodes, for which the corresponding CPU boards carry out arithmetic operations, labels 521 for graphically displaying arithmetic operation results of models, or the like. For example, as shown in FIG. 7, the control picture 520 displays a number-of-revolutions meter indicating the number of engine revolutions or the number of turbine revolutions, a degree-of-opening meter indicating the degree of opening of a throttle or the degree of opening of an accelerator, number-of-revolutions meters indicating the number of revolutions of a primary sheave and the number of revolutions of a secondary sheave, an indicator lamp corresponding to a selected shift range, a shift switch for switching the shift range, a battery switch for controlling a voltage supply state of the battery, an ignition switch for starting the engine, and the like.

Each label 521 serving as a display portion of an arithmetic operation result of a simulator based on a simulation model is displayed on the host PC 5.

The condition setting means 54 is configured to allow the operator to provide a command to each simulator by setting or changing simulation conditions based on an operation of the operation switch 522 displayed on the control picture 520.

For example, a traveling range is sequentially changed according to an operation of the shift switch, the corresponding indicator lamp is displayed, and an arithmetic operation of a transmission model is carried out in the corresponding range. When the battery switch is operated, power is supplied to each ECU and the like connected to each simulator. When the ignition switch is operated, the start or stop of the engine is indicated in the engine model.

When a simulation activation command is output from the simulation control means 55, an arithmetic operation of a model implanted into each simulator is carried out on the basis of conditions set by the condition setting means 54. Arithmetic operation results are displayed on the control picture 520 by the controller display means 52, such that its evaluation is carried out.

The above-described control picture 520 is only one example. For example, in the case of the number of engine revolutions, the number of revolutions is displayed in a trend graph on a time axis and a number-of-revolutions axis. As the displayed control picture 520 is viewed, simulation results can be visually checked.

The host PC 5 further includes a notification means 53 for providing a notification in which information regarding a simulation model displayed on the display section is related to a simulator for executing the simulation model such that the operator can detect a correspondence relation between each simulator serving as a hardware resource connected to the host PC 5 and a simulation model serving as a software resource assigned to a certain CPU board of the each simulator.

Hereinafter, specific aspects of the notification means 53 for relating an arithmetic operation result of a simulation model to a simulator for executing the simulation model will be described.

In the first aspect, the notification means 53 is configured to display the labels 521 serving as display portions of arithmetic operation results of simulation models displayed on the control picture 520 in different display forms such that the labels 521 are related to simulators having CPU boards for carrying out arithmetic operations of the models.

Figure 9A:
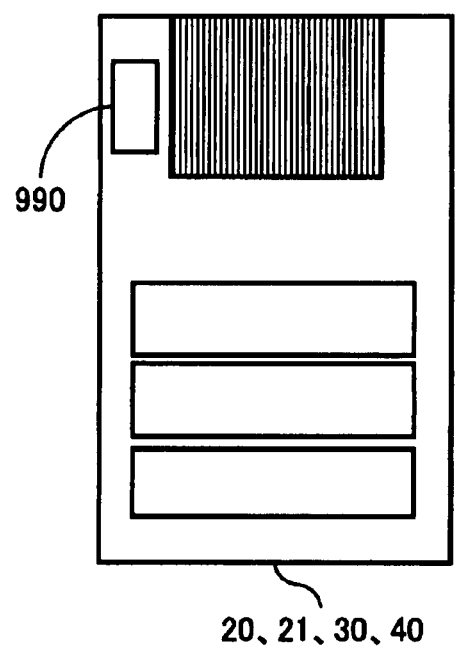
FIG. 9(*a*) is an illustrative view of an image color display section of a simulation device (or simulator)
Figure 9B:
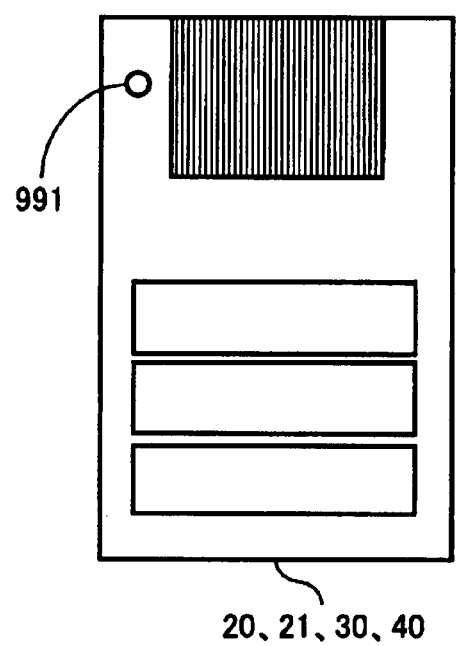

Specifically, the notification means 53 includes a first display color selecting means for selecting and designating a display color of each label 521, and is configured to display each label 521 in a hue of the selected display color. As shown in FIG. 9(*a*), color plates 990 of different colors are respectively attached to casings of the simulators 20, 21, 30, and 40. As the first display color selecting means selects and sets the display colors of the labels 521 equal to the colors of the color plates 990 of the corresponding simulators 20, 21, 30, and 40, the labels displayed on the display section or the arithmetic operation results of the simulation models are uniquely related to the simulators.

For example, the first display color selecting means can be realized with a configuration in which a color similar to that of the corresponding color plate 990 is selected from a color pallet displayed by overlapping a mouse pointer on a display area of each label 521 and selecting a "display color selection" menu from a menu list displayed by a right click. Each of the simulators 20, 21, 30, and 40 includes a plurality of CPU boards. When the first display color selecting means selects a display color for one of the labels corresponding to the simulation models, the display colors of the labels corresponding to the simulation models can be automatically set to the same color. In this case, the effort of individually selecting the display colors of the labels can be reduced.

In place of the color plates 990 provided in the simulators 20, 21, 30, and 40, color liquid crystal panels can be provided. A display control operation can be carried out for a color similar to a display color of a label selected by the first display color selecting means or a display portion of an arithmetic operation result of a simulation model in response to a control signal from the host PC 5. Each of the simulators 20, 21, 30, and 40 includes a plurality of CPU boards. In the case where the first display color selecting means selects different display colors for the labels corresponding to the simulation models, display control operations can be simultaneously carried out for display colors by regionally dividing the color liquid crystal panels. Accordingly, the degree of freedom of display color selection of the labels can be high and the number of simulation models related to the simulators 20, 21, 30, and 40 can be discriminated on the basis of the number of display colors. Furthermore, a display control operation for switching display colors according to time division can be cared out by making a change to a display control configuration for regionally dividing the color liquid crystal panels and simultaneously displaying the display colors.

The corresponding simulator can be easily identified using a name of the corresponding simulator marked on the color plate 990 or the color liquid crystal panel.

There has been described a configuration in which a correspondence relation between both sides can be recognized by matching the hues of a simulator and a display portion of an arithmetic operation result of a corresponding simulation model using the hues in the display form. Alternatively, in addition to the hue, chroma, brightness or combinations thereof can be used in the display form.

In the second aspect, the notification means 53 is configured to display identification information of the corresponding simulator in the vicinity thereof when a predefined operation is done for a label 521 displayed on the control picture 520 or a display portion of an arithmetic operation result of a simulation model.

Specifically, when a predefined operation is done to move the mouse pointer to the label 521, the notification means 53 is activated to control a simulation name (or node name) and a CPU board name corresponding to the label 521 on which the mouse pointer has overlapped to be displayed in the vicinity of the label 521.

Figure 10:
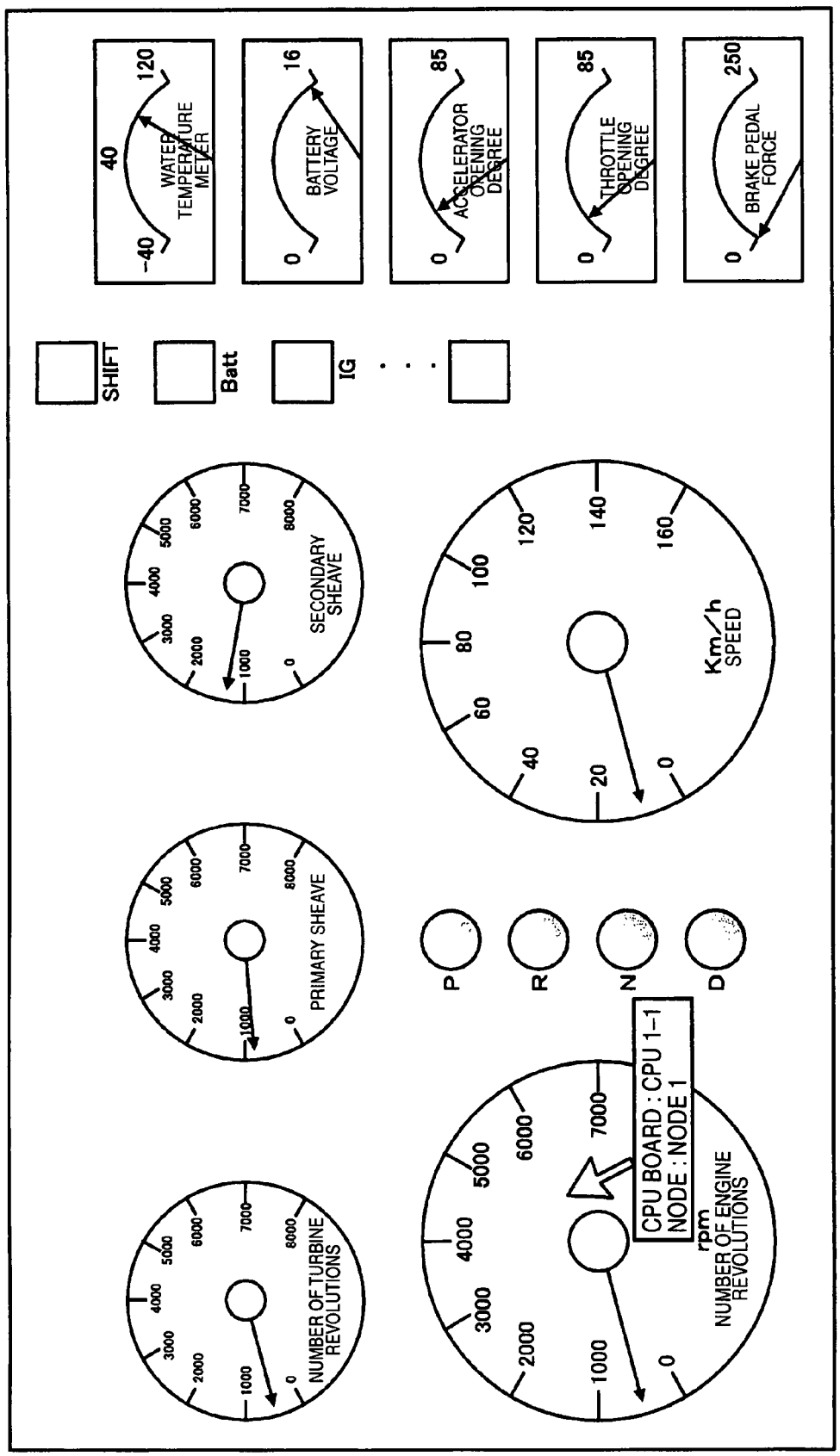
FIG. 10 is an illustrative view of a control picture.

For example, when the operator overlaps the mouse pointer on an indication meter of the number of engine revolutions serving as one of the labels as shown in FIG. 10, a name of a CPU board for executing the engine model and a name of a node including the CPU board are pop-up displayed in the vicinity of the meter. In addition to an operation for indicating the label 521 with the mouse pointer as the predefined operation for activating the notification means 53, an arbitrary operation such as the left or right click after indicating the label 521 with the mouse pointer or the double click can be adopted if it is preset.

In the third aspect, the notification means 53 is configured to cause the corresponding simulator to provide a distinguishable notification when a predefined operation is done for the label 521 displayed on the control picture 520 or a display portion of an arithmetic operation result of a simulation model.

Specifically, each simulator includes a notification section. When the mouse pointer is moved to the label 521 in the predefined operation and the double click is performed, the notification means 53 is activated to control a predefined notification to be provided from the notification section of a simulator corresponding to the label 521 on which the mouse pointer has overlapped.

For example, as shown in FIG. 9(*b*), notification sections of the simulators 20, 21, 30, and 40 respectively include a light emitting section 991 such as a light emitting diode (LED). When the operator overlaps the mouse pointer on an indication meter of the number of engine revolutions serving as one of the labels and performs the left click, the light emitting section 991 of a insulator having a CPU board for executing the engine model is lighted or flashed and displayed. As in the second aspect, an operation for indicating the label 521 with the mouse pointer and an arbitrary operation such as the left or right click after indicating the label 521 with the mouse pointer or the double click can be adopted as the predefined operation for activating the notification means 53.

The notification section provided in each of the simulators is not limited to the light emitting section 991 such as the LED or the like. There can be adopted an arbitrary configuration capable of being detected by the operator through an operation for flashing a node name on a liquid crystal panel, an operation for switching a display color of a liquid crystal panel such that the color is different from that of another simulator, an operation for outputting a sound by providing a sound means such as a buzzer, an operation for outputting a sound by providing a voice synthesis circuit, and an operation for making vibration by providing a vibrator such as a rotating vibrator or the like.

In the fourth aspect, when a predefined operation is done for each simulator, the notification means 53 is configured to carry out a display operation such that a display form of an arithmetic operation result of a simulation model for which the operation is done is different from that of another simulation model.

Specifically, the casing of each of the simulators 20, 21, 30, and 40 includes, for example, a self-return type push switch. When the operator presses the push switch, the notification means 53 displays a label for reflecting an arithmetic operation result of a model assigned to the corresponding simulator or a display portion of an arithmetic operation result of a simulation model in a display form different from that of another label.

For example, when the operator presses a push switch of the simulator 30 for simulating the brake system, a label for indicating the brake pedal force is flashed and displayed. The display form is not limited to a flashing indication. Any display form capable of being distinguished from those of other simulation models can be used. The hue, chroma, brightness, or the like of the corresponding label can be displayed to be different from another label. A display form capable of being distinguished from those of other labels can use combinations of the hue, chroma, brightness, and the like.

In the fifth aspect, at least one simulator includes a plurality of CPU boards carrying out arithmetic operations based on different simulation models. The notification means 53 is configured to display information regarding a simulation model for which each CPU board carries out an arithmetic operation under a layer of each CPU board serving as a component of each simulator hierarchically displayed in a tree form on the display section of the host PC 6.

Figure 11:
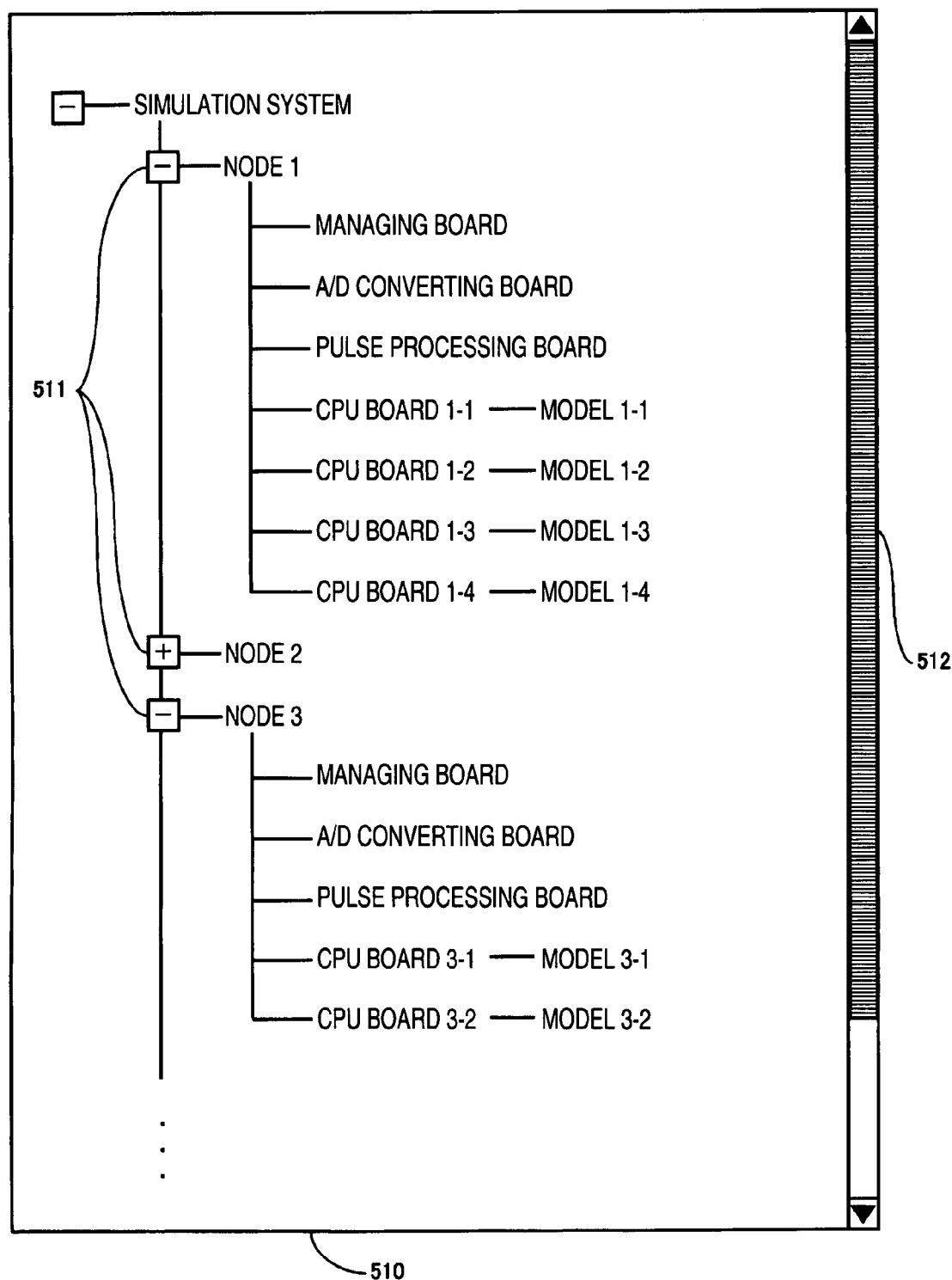
FIG. 11 is an illustrative view of a component display picture.

Specifically, as shown in FIG. 11, the notification means 53 provides a notification in which a displayed simulation model is related to a simulator for carrying out an arithmetic operation based on the simulation model, by displaying a simulation model name of a simulation model assigned to a CPU board in a lower layer of a plurality of CPU boards displayed in a lower layer of each node displayed on the component display picture 510.

In the sixth aspect, at least one simulator includes a plurality of CPU boards for cawing out arithmetic operations based on different simulation models. The notification means 53 is configured to display information regarding each CPU board serving as a component of each simulator hierarchically displayed in a tree form on the display section of the host PC 5 and a simulation model for which the CPU board carries out an arithmetic operation in a display form different from that of information regarding another CPU board and another simulation model such that a correspondence relation can be identified.

Specifically, the notification means 53 includes a second display color selecting means for selecting and designating a display color of each CPU board. The notification means 53 is configured such that each CPU board and a simulation model name, serving as information regarding a simulation model assigned to the CPU board, are displayed in the hue of a selected display color. In other words, it can be identified that a model of a simulation model name displayed in the same color as a display color of a CPU board name is assigned to a corresponding CPU board. There has been described a configuration in which a correspondence relation between both sides can be recognized by matching the hues of a CPU board configuring a simulator and a corresponding simulation model name using the hues in the display form. Alternatively, in addition to the hue, chroma, brightness or combinations thereof can be used in the display form.

In the seventh aspect, at least one simulator includes a plurality of CPU boards for carrying out arithmetic operations based on different simulation models. When a predefined operation is done for a display portion of each CPU board serving as a component of each simulator hierarchically displayed in a tree form on the display section of the host PC 5 and a simulation model for which each CPU board carries out an arithmetic operation, the notification means 53 is configured to display identification information of the corresponding simulation model or CPU board in the vicinity thereof.

Specifically, when the mouse pointer is moved by a predefined operation on a CPU board name displayed on the component display picture 510, a simulation model name assigned to a corresponding CPU board is pop-up displayed in the vicinity of the CPU board name assigned to the corresponding CPU board on which the mouse pointer has overlapped. When the mouse pointer is moved to the simulation model name, a CPU board name to which the corresponding simulation model has been assigned is displayed in the vicinity of the simulation model name on which the mouse pointer has overlapped.

Figure 12:
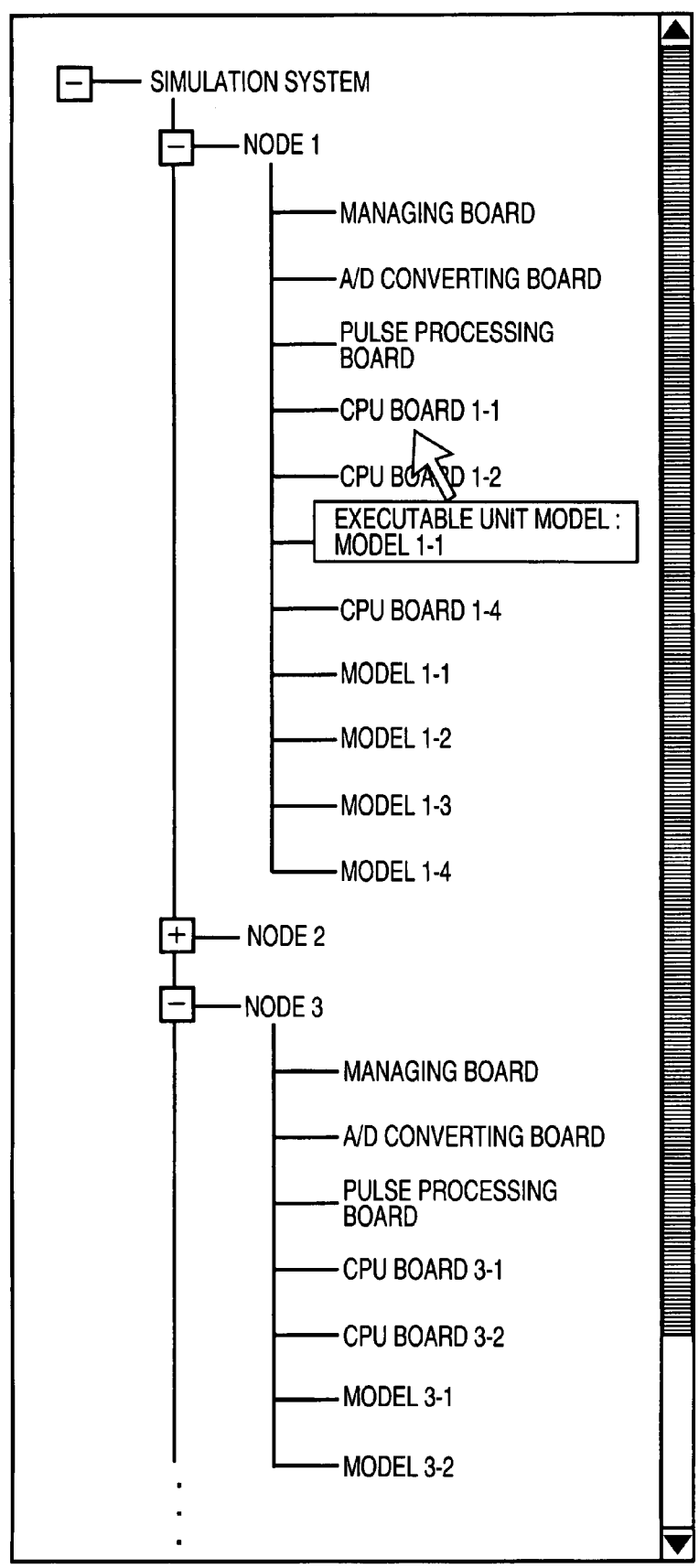
FIG. 12 is an illustrative view of a component display picture.

For example, when the operator overlaps the mouse pointer on CPU Board 1-1 of Node 1 as shown in FIG. 12, Model 1-1 serving as a model name corresponding to CPU Board 1-1 is pop-up displayed in the vicinity of CPU Board 1-1. As described above, in addition to an operation for indicating the label 521 with the mouse pointer as the predefined operation for activating the notification means 53, an arbitrary operation such as the left or right a click after indicating the label 521 with the mouse pointer or the double click can be adopted if it is preset.

In the eighth aspect, information regarding each simulator configuring the system and a component thereof are hierarchically displayed on the display section of the host PC 5. When a predefined operation is done for a display portion of information regarding a specific simulator, the notification means 53 is configured to cause the corresponding simulator to provide a distinguishable notification.

Specifically, the notification section is provided in each simulator. When a predefined operation is done by a pointing device for a display portion of a CPU board name displayed on the component display picture 510 and a simulation model name assigned to the CPU board, the notification means 53 detects the predefined operation and controls a predefined notification to be provided from the notification section of the simulator corresponding to the CPU board name on which the mouse pointer has overlapped or the simulation model name.

For example, each of the simulators 20, 21, 30, and 40 includes the light emitting section such as the LED or the like serving as the notification section. When a display portion of a CPU board name or a model name is left clicked with the mouse pointer by the operator, the light emitting section of the corresponding simulator is flashed and displayed.

As in the third aspect, a predefined operation for activating the notification means 53 can adopt an operation for indicating a display portion of a CPU board name or a model name with the mouse pointer or an arbitrary operation such as the left or right click after indicating with the mouse pointer or the double click.

The notification section provided in each of the simulators can adopt an arbitrary configuration capable of being detected by the operator through an operation for flashing a node name on a liquid crystal panel an operation for switching a display color of a liquid crystal panel such that the color is different from that of another simulator, an operation for outputting a sound by providing a sound means such as a buzzer, an operation for outputting a sound by providing a voice synthesis circuit, and an operation for making vibration by providing a vibrator such as a rotating vibrator or the like.

The information regarding the simulation models executed by the simulators, which is used for providing the notification is transmitted from respective simulators to the management device. For example, each simulator is configured to transmit, to the management device own identification information (identification information of the simulator) and identification information of the simulation model on which the simulator executes the arithmetic operation based. The management device may be configured to receive and manage the identification information. In this case, the liming for transmitting the identification information to the management device by the simulators may include when the simulator is activated, when the management device requests the simulator to transmit the identification information, or when the simulation model on which the simulator executes the arithmetic operation based is changed (for example, when data regarding the simulation model is updated, or when it is detected that the CPU board which executes the arithmetic operation based on the simulation model is removed) and so on.

As described above, in the decentralized simulation system according to the invention, an identification method for outputting visual or audible identification information is implemented such that a plurality of simulation models serving as software resources displayed on the host PC 5 are related to the simulators 20, 21, 30, and 40 serving as hardware resources to which the simulation models has been assigned.

When the host PC 5 assigns a simulation model to a CPU board of each simulator and sets a simulation condition, the simulation control means 55 activates a simulation arithmetic process.

Next, a simulation arithmetic operation to be performed in each of the simulators 20, 21, 30, and 40 will be described in detail. Each of the simulators 20, 21, 30, and 40 is controlled to repeat a unit simulation arithmetic process configured with a set of arithmetic operation steps having different functions in a predefined period, for example, a period of 1 msec, under the control of each managing board 90.

Figure 13:
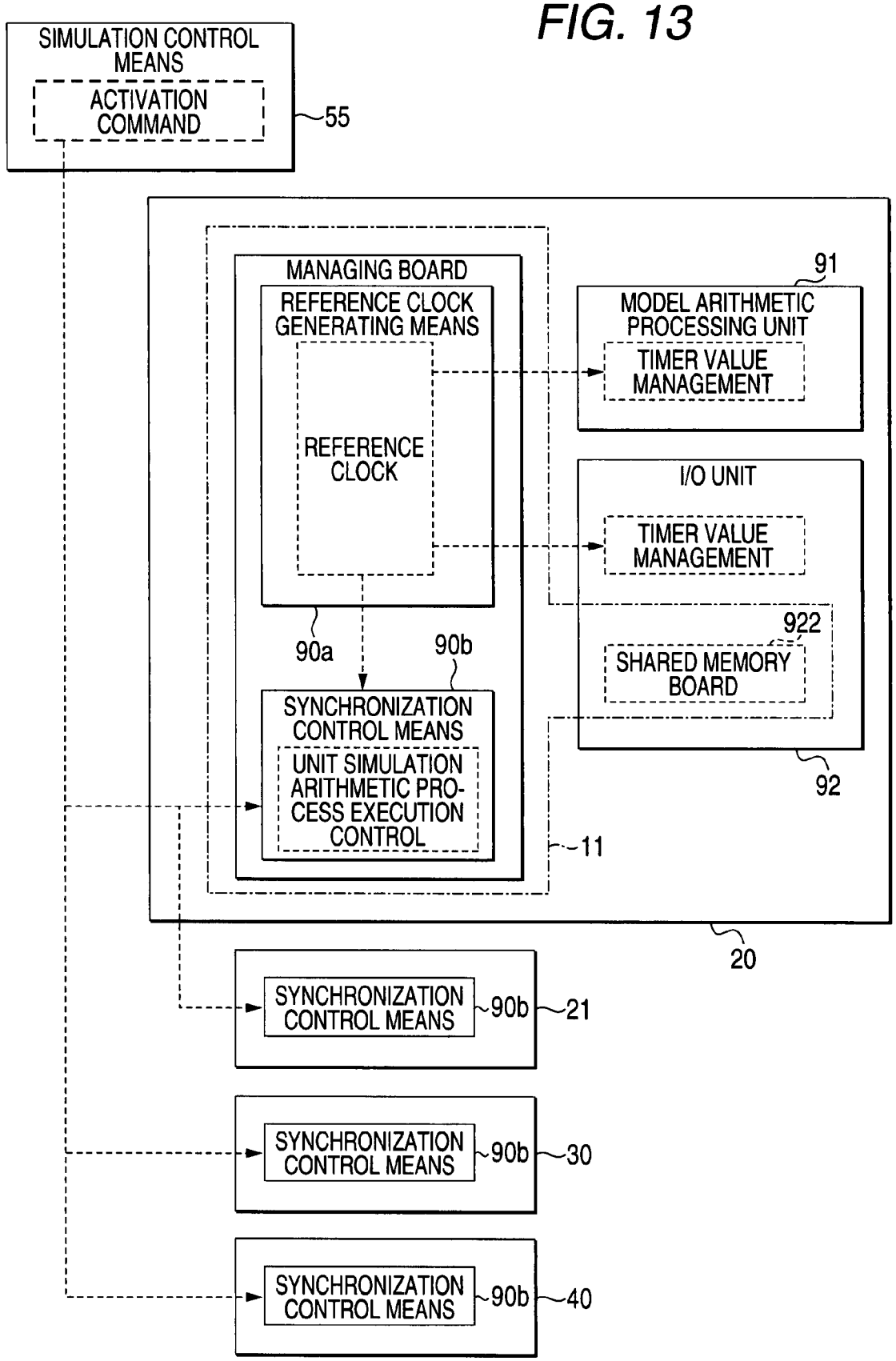
FIG. 13 is an illustrative view of a managing board.

As shown in FIG. 13, a reference clock generating means for controlling an internal operation is provided in the managing board 90 of each of the simulators 20, 21, 30, and 40. Each of the model arithmetic processing unit 91, the I/O unit 92, or the like is configured to manage a timer value required for an arithmetic operation process based on a reference clock from a reference clock generating means 90a In other words, the CPU provided in each unit performs a preset arithmetic operation process according to a timer register value based on an internal clock, but a timer process required for an arithmetic operation is determined on the basis of the reference clock.

In the managing board 90, a synchronization control means 90b is provided such that all the simulators 20, 21, 30, and 40 embedded in the decentralized simulation system 1 are synchronized and perform a unit simulation arithmetic process in cooperation with the data sharing means 11.

As shown FIG. 13, when an activation command is transmitted from the simulation control means 55 of the host PC 5, the synchronization control means 90b activates a unit simulation arithmetic process of the local device on the basis of the reference clock, acquires the synchronization of arithmetic operation timing between the simulators before the start or after the end of a step among a plurality of steps into which the unit simulation arithmetic process is divided, and performs a control operation such that all the simulators can be synchronized to perform the unit simulation arithmetic process. Furthermore, the simulator 21 receives the activation command via the simulator 20 and the network 8.

Figure 14:
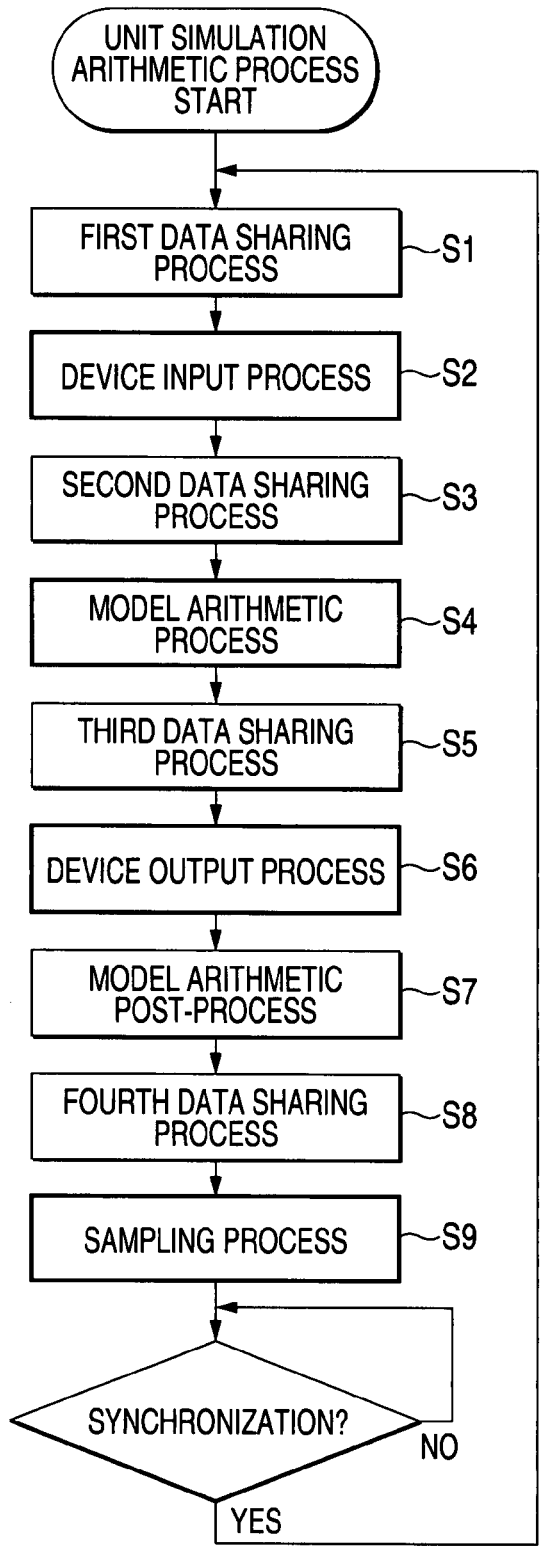
FIG. 14 is a flowchart showing a unit simulation arithmetic process.

As shown in FIG. 14, the unit simulation arithmetic process includes a first data sharing process (S1) for initially storing data required for another simulator or related data in the transmission data region 923b of the shared memory 923 and loading related data required for the local device from another simulator in the reception data region 923a of the shared memory 923, a device input process (S2) for loading data from an ECU in the I/O unit 92, a second data sharing process (S3) for storing related data or data required for a model arithmetic operation of another simulator among the loaded data in the transmission data region 923b of the shared memory 923 and loading related data required for a model arithmetic operation of the local device among data loaded by another simulator in the reception data region 923a of the shared memory 923, a model arithmetic process (S4) in which the model arithmetic processing unit 91 receives required data from the I/O unit 92 and the reception data region 923a after completing the sharing process and performs an arithmetic operation for a model a third data sharing process (S5) for storing related data or data required for another simulator among arithmetic operation results after completing an arithmetic operation for a model in the transmission data region 923b of the shared memory 923 and loading related data required for the local device among arithmetic operation results of another simulator in the reception data region 923a of the shared memory 923, a device output process (S6) for outputting arithmetic operation results for a model to the I/O unit 92, a model arithmetic post-process (S7) for outputting arithmetic operation results or a progress state indicating the completion or non-completion of an arithmetic operation, a fourth data sharing process (S8) for storing data serving as data related to another simulator sampled from the I/O unit 92 after the device output process in the transmission data region 923b of the shared memory 923 and loading related data required for the local device to be sampled from the I/O unit 92 of another simulator in the reception data region 923a of the shared memory 923, and a sampling process (S9) for sampling preset required data from the I/O unit 92 and the reception data region 923a, storing the sampled data in a memory of the managing board 90, and outputting the sampled data to the host PC 5. After completing the steps, synchronization is acquired in a preset arithmetic operation period and the process returns to step S1 (S10).

The data sharing process between master simulators has been described in the above-described sharing process. Alternatively, the data sharing process can be also performed between master and slave simulators.

That is, the unit simulation arithmetic process is configured with a data input step from at least the control system, a model arithmetic operation step for simulating the controlled system, a data output step to the control system of model arithmetic operation results, and a sampling step for sampling preset required data, storing the sampled data in a memory of the managing board 90, and outputting the sampled data to the host PC 5. The data sharing means is configured to match related data between the simulators before starting each of the data input step, the model arithmetic operation step, the data output step, and the sampling step.

Figure 15:
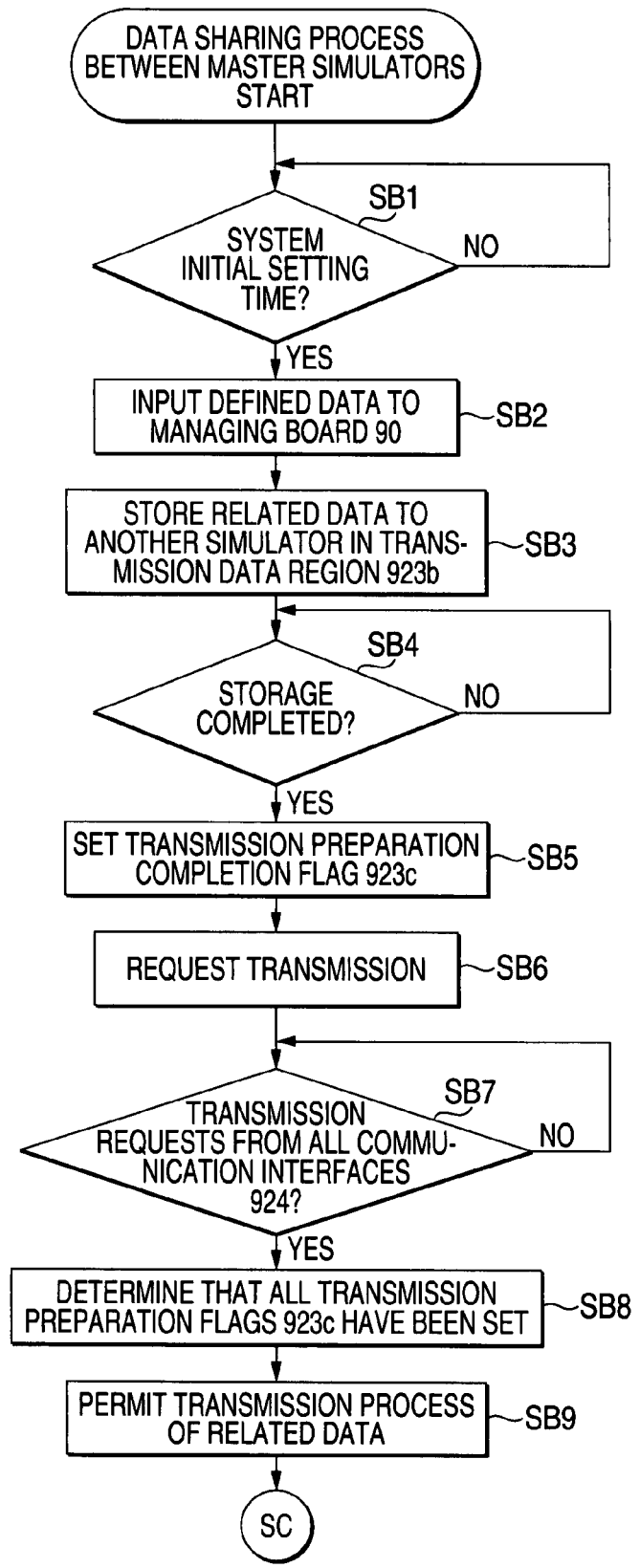
FIG. 15 is a flowchart used to illustrate a data sharing process between master simulators.
Figure 16:
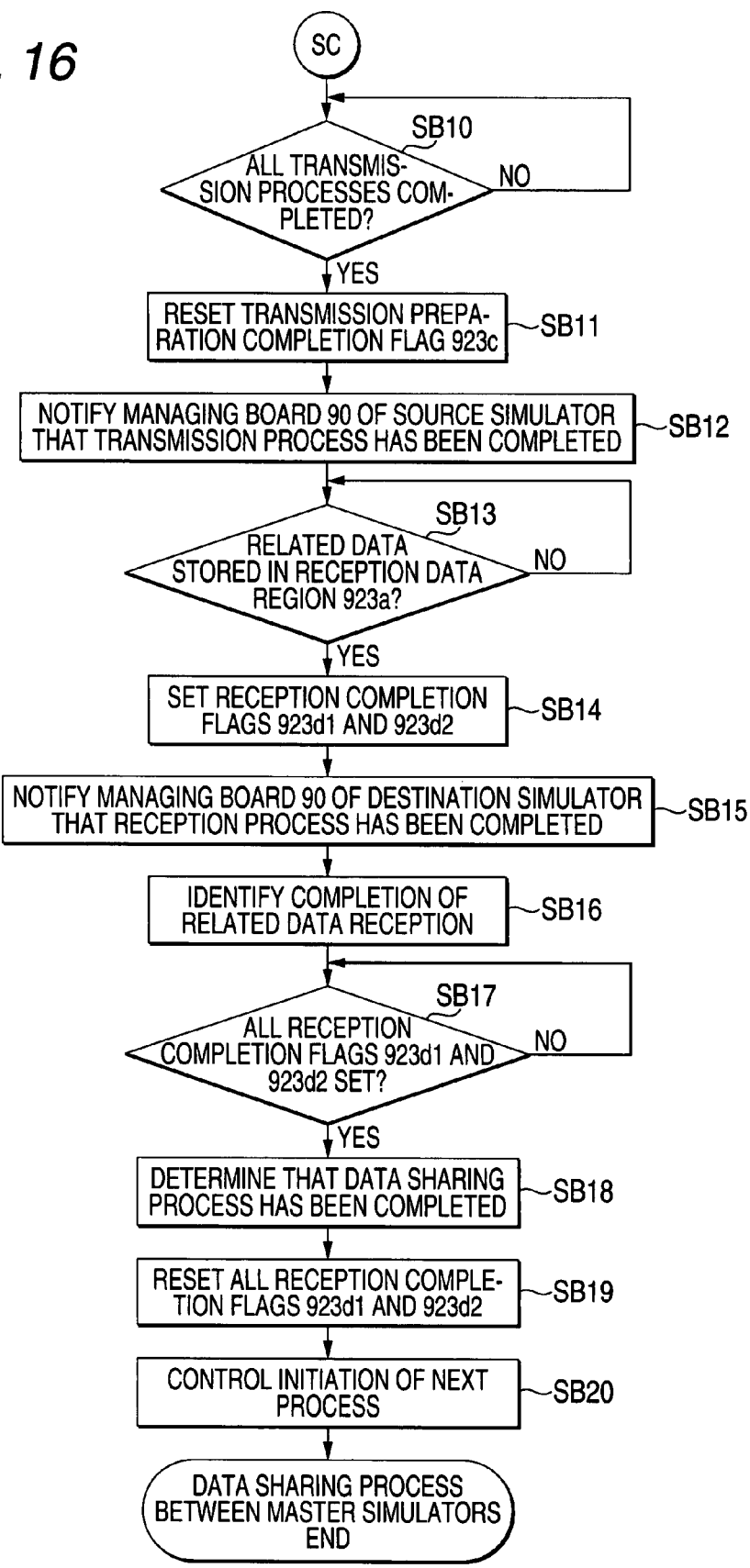
FIG. 16 is a flowchart used to illustrate a data sharing process between master simulators.

The above-described first to fourth data sharing processes will be described with reference to the flowcharts of FIGS. 15 and 16 and FIG. 5. In the managing board 90 of each of the simulators 20, 30, and 40, related data to be shared with another simulator is predefined by the host PC 5. Upon initial setting of the system (SB1), simulation model assignment to each node or simulation initiation, the defined data serving as part of simulation conditions is input to each managing board 90 (SB2).

The managing board 90 of each simulator stores related data to be transmitted to another simulator in the transmission data region 923b of the shared memory 923 of the local device (SB3). When all the related data to be transmitted is stored (SB4), a transmission preparation completion flag 923c is set (SB5). Each communication interface 924 in which the transmission preparation completion flag 923c is set sends a transmission request to the communication control means 927 for managing each communication interface (SB6). The communication control means 927 waits until transmission requests are received from all the communication interfaces 924 (SB7).

When related data to be transmitted is absent or a value is not changed from previously transmitted related data, only the transmission preparation completion flag 923c is set.

When the transmission requests are received from all the communication interfaces 924 (SB7), the communication control means 927 determines that the transmission preparation completion flags 923c of all the simulators 20, 30, and 40 are set (SB8), and permits a transmission process of related data in a preset sequence (SB9). Specifically, first, the communication interface 924 provided in the first simulator 20 sequentially receives related data stored in the transmission data region 923b of the shared memory 923 for every destination and t its the related data to the communication interfaces 924 of the simulators 30 and 40 of the destinations. The communication interfaces 924 of the simulators 30 and 40 respectively store the related data in the reception data region 923a of the shared memory 923. The transmission process of this related data is repeated for each of the simulators 30 and 40.

When all transmission processes of related data stored in the transmission data region 923b are completed (SB10), the communication interface 924 of the source resets the transmission preparation completion flag 923c set in the corresponding transmission data region 923b (SB11) and notifies the managing board 90 of the corresponding simulator that the transmission process has been completed (SB12).

When related data from another simulator is stored in the reception data region 923a (SB13), the communication interface 924 of the destination sets reception completion flags 923d1 and 923d2 of the reception data region 923a divided in each simulator of the destination (SB14), and notifies the managing board 90 having the synchronization control means 90b of the simulator of the destination that the reception process of the related data for each source has been completed (SB15). When the reception completion flags 923d1 and 923d2 of the reception data region 923a are set (SB16), the managing board 90 (or the synchronization control means 90b) of the simulator of the destination determines that the related data from the simulator of the source has been completely received (SB17).

When waiting until the transmission preparation completion flag 923c of the transmission data region 923b is reset (SB11) and all the reception completion flags 923d1 and 923d2 of each source of the reception data region 923a are reset (SB16), and identifying that the transmission preparation completion flag 923c of the transmission data region 923b is reset (SB11) and all the reception completion flags 923d1 and 923d2 of each source of the reception data region 923a are reset (SB17), the managing board 90 (or the synchronization control means 90b) of each of the simulators 20, 30, and 40 determines that the data sharing process has been completed (SB18), resets all the reception completion flags 923d1 and 923d2 (SB19), and controls the next process to be initiated (SB20).

In the simulators 20, 30, and 40 according to the above operation, the data input step from the control system, the model arithmetic operation step for simulating the controlled system, the data output step to the control system of model arithmetic operation results, the model arithmetic process step, and the sampling step are synchronized and executed, such that the unit simulation arithmetic process is smoothly performed.

On the basis of the transmission preparation completion flag 923c, the data sharing means 11 performs a data sharing process after acquiring synchronization with another simulator sending related data. When the reception completion flags 923d1 and 923d2 of the shard memory 923 are set which indicate that a process to be performed before the data sharing process or any process of the device input process, the model arithmetic process, the device output process, the model arithmetic post-process, and the sampling process is completed, it is determined that synchronization for matching related data has been acquired with the other simulator.

In the above-described data sharing process, the managing board 90 of each of the simulators 20, 30, and 40 stores relevant data to be transmitted to another simulator in the transmission data region 923b of the shared memory 923 of the local device, and sets the transmission preparation completion flag 923c. An operation for storing the related data in the transmission data region 923b of the shared memory 923 of the local device and setting the transmission preparation completion flag 923c is not limited to the managing board 90. Alternatively, the operation can be performed by the model arithmetic processing unit 91 in the data sharing process based on the model arithmetic process under monitoring of the managing board 90 and by the I/O unit 92 in the data sharing process based on the device output process.

Figure 17:
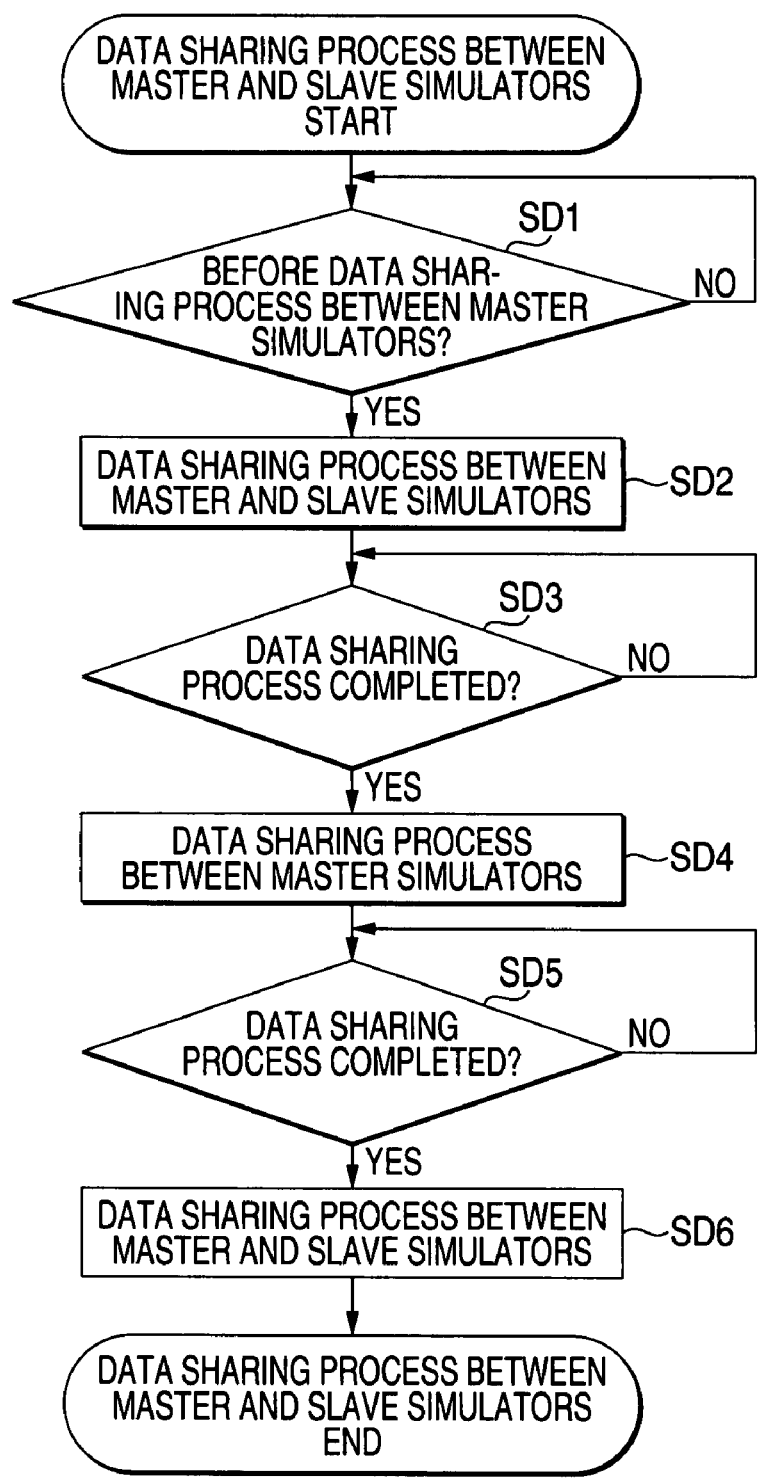
FIG. 17 is a flowchart used to illustrate a data sharing process between master and slave simulators.

The above-described data sharing process is that between master simulators. Before the data sharing process between the master simulators (SD1) as shown in FIG. 17, the sharing process of related data to be transmitted to another simulator is performed between master and slave simulators (SD2). After the data sharing process (SD3), the data sharing process is performed between the master simulators (SD4). After the data sharing process between the master simulators (SD5), the sharing process of related data to be received from another master simulator is performed between the master and slave simulators (SD6). Related data to be shared only between the master and slave simulators can be processed before or after the data sharing process between the master simulators.

As described above, all the simulators 20, 21, 30, and 40 can perform the unit simulation arithmetic process by acquiring synchronization. When reference docks from the reference clock generating means 90a are slightly different between the simulators and arithmetic operation results based on the reference clocks are accumulated, a significant error occurs and arithmetic accuracy of the simulators may be significantly affected.

Thus, synchronization clock data generated by a synchronization clock generating means 5a provided in the host PC 5 is configured to be transmitted to the simulators 20, 21, 30, and 40 via the network 6. The managing board 90 of each of the simulators 20, 21, 30, and 40 includes a clock correcting means 90c for correcting a timer register value based on a reference dock of a simulation arithmetic operation according to the synchronization clock data.

Figure 18:
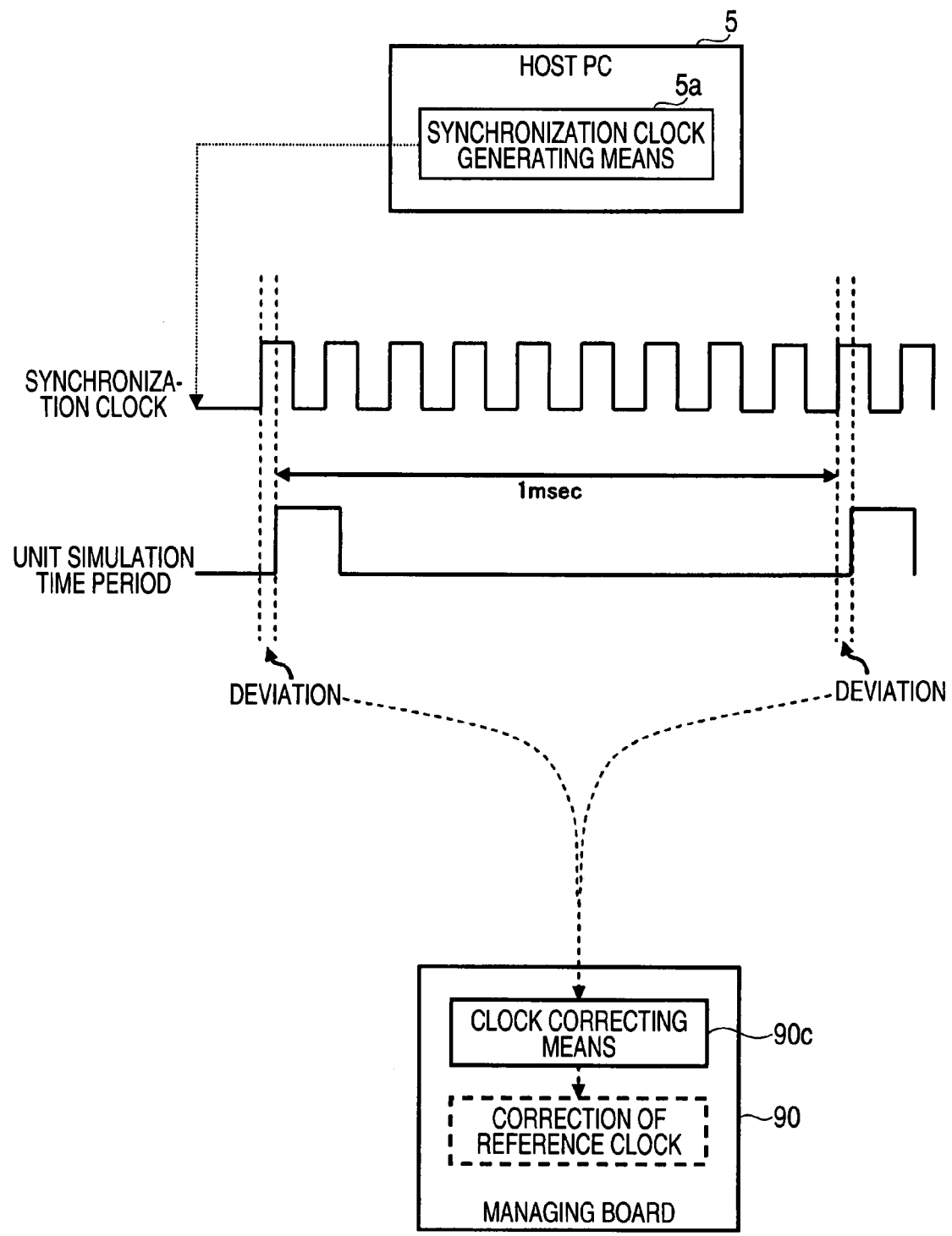
FIG. 18 is a view used to illustrate correction of a reference clock.

Since the synchronization dock data is input at a shorter time interval than a time of 1 msec of the unit simulation arithmetic process operating in response to the reference clock as shown in FIG. 18, the simulators 20, 21, 30, and 40 can correct a minor deviation of the reference clock by means of the clock correcting means 90c.

Next, other embodiments will be described. The simulator 20 serving as the master simulator and the simulator 21 serving as the slave simulator cooperatively configure a node of the engine serving as the controlled system. However, the number of slave simulators connected to the master simulator is not specially limited.

In the above-described embodiment, the decentralized simulation system 1 for simulating functional blocks of a vehicle controlled in a decentralized form by a plurality of electronic control units has been described. The decentralized simulation system 1 is not limited to the vehicle as a target, and is applicable in the case where a complex processing system such as an airplane, an air conditioning system, a chemical plant system, or the like is simulated.

In the above-described embodiment, the case where the simulators 20, 21, 30, and 40 are connected to the electronic control units 2, 3, and 4 serving as the control systems has been described If external data required for the simulators is provided, a connected external device is not limited to a control device.

An aspect in which information regarding a model is related to a simulator for executing the model by the notification means 53 as described in the above-described embodiment can be independently realized, and can be realized by combining a plurality of aspects.

In the above-described embodiment, the component display picture 510 and the control picture 520 can be respectively displayed in separate windows, and can be displayed in one window in which the control picture 520 is arranged in parallel to the left or right side of the component display picture 510.

The above-described embodiment is one example for realizing the invention. The specific configurations of sections can be appropriately modified and designed according to a system to be constructed as long as the effect of the invention can be achieved.

What is claimed is:

1. A decentralized simulation system, comprising:
a management device having a display and an input device; and
a plurality of simulators connected to the management device via a network and configured to decentrally repeat simulation arithmetic operations based on a plurality of simulation models with a predetermined period,
wherein the management device includes an assignment section configured to assign the simulation models to the simulators, respectively, in accordance with an operation of a user,
wherein each of the simulators has a notifying device configured to provide a notification which allows the user to recognize a correspondence relationship between the simulators and the simulation models,
wherein results of the simulation arithmetic operations based on the simulation models by the simulators are displayed on the display of the management device, and
wherein, when the user selects one of the results on the display with use of the input device, the notifying device of one of the simulators which outputs the one of the results to the management device operates to provide the notification of the corresponding relationship directly to the user.

2. The decentralized simulation system as set forth in claim 1,
wherein the notifying device of the each of the simulators is a light emitting device,
wherein, when the user selects the one of the results on the display with use of the input device, the light emitting device of the one of the simulators which outputs the one of the results to the management device emits light to provide the notification of the corresponding relationship directly to the user.

3. The decentralized simulation system as set forth in claim 1,
wherein the notifying device of the each of the simulators is one of a speaker and a vibrator,
wherein, when the user selects the one of the results on the display with use of the input device, the speaker or the vibrator of the one of the simulators which outputs the one of the results to the management device outputs sound or generates vibration to provide the notification of the corresponding relationship directly to the user.

4. The decentralized simulation system as set forth in claim 1,
wherein when the user selects the one of the results on the display with use of the input device, identification information of the one of the simulators which outputs the one of the results to the management device is displayed in the vicinity of the one of the results on the display so as to provide the notification of the correspondence relationship to the user.

5. The decentralized simulation system as set forth in claim 1,
wherein at least one of the simulators includes a plurality of CPU boards configured to execute different arithmetic operations based on different simulation models,
wherein a hierarchical tree of the simulators and the simulation models is displayed on the display of the management device, and
wherein when the user selects one of the simulation models in the hierarchical tree with use of the input device, the notifying device of one of the simulators which corresponds to the one of the simulation models operates to provide the notification of the correspondence relationship to the user.

6. The decentralized simulation system as set forth in claim 1, wherein synchronization of arithmetic operation timing between the plurality of simulators is acquired during a preset arithmetic operation period.

* * * * *